(12) United States Patent
Dziong et al.

(10) Patent No.: US 7,500,013 B2
(45) Date of Patent: Mar. 3, 2009

(54) CALCULATION OF LINK-DETOUR PATHS IN MESH NETWORKS

(75) Inventors: Zbigniew M. Dziong, Atlantic Highlands, NJ (US); Muhammad A. Qureshi, Irvine, CA (US); Yung-Terng Wang, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 832 days.

(21) Appl. No.: 10/817,760

(22) Filed: Apr. 2, 2004

(65) Prior Publication Data

US 2005/0220026 A1 Oct. 6, 2005

(51) Int. Cl.
*G06F 15/173* (2006.01)
*G06F 12/00* (2006.01)

(52) U.S. Cl. ............................... 709/238; 709/249

(58) Field of Classification Search ............... 709/238, 709/239, 249, 250
See application file for complete search history.

(56) References Cited

U.S. PATENT DOCUMENTS

| | | | | |
|---|---|---|---|---|
| 4,190,821 A | | 2/1980 | Woodward | 714/4 |
| 4,594,709 A | | 6/1986 | Yasue | 714/4 |
| 4,797,882 A | * | 1/1989 | Maxemchuk | 370/406 |
| 5,506,956 A | | 4/1996 | Cohen | 395/182.04 |
| 5,706,276 A | | 1/1998 | Arslan et al. | 370/216 |
| 5,754,543 A | * | 5/1998 | Seid | 370/351 |
| 5,854,903 A | | 12/1998 | Morrison et al. | 395/200.79 |
| 5,856,981 A | | 1/1999 | Voelker | 371/20.1 |
| 5,881,048 A | | 3/1999 | Croslin | 370/228 |
| 5,933,422 A | | 8/1999 | Kusano et al. | 370/331 |
| 5,933,425 A | * | 8/1999 | Iwata | 370/351 |
| 5,956,339 A | * | 9/1999 | Harada et al. | 370/400 |
| 5,995,485 A | | 11/1999 | Croslin | 370/216 |
| 6,075,766 A | | 6/2000 | Croslin | 370/225 |
| 6,104,701 A | | 8/2000 | Avargues et al. | 370/238 |
| 6,130,875 A | | 10/2000 | Doshi et al. | 370/225 |
| 6,141,319 A | | 10/2000 | Dighe et al. | 370/218 |
| 6,205,117 B1 | | 3/2001 | Doshi et al. | 370/228 |
| 6,282,170 B1 | | 8/2001 | Bentall et al. | 370/225 |
| 6,477,582 B1 | * | 11/2002 | Luo et al. | 709/241 |
| 6,538,987 B1 | | 3/2003 | Cedrone et al. | 370/216 |
| 6,549,513 B1 | | 4/2003 | Chao et al. | 370/227 |
| 6,606,303 B1 | * | 8/2003 | Hassel et al. | 370/238 |
| 6,697,334 B1 | | 2/2004 | Klincewicz et al. | 370/238 |
| 6,711,125 B1 | | 3/2004 | Walrand et al. | 370/223 |
| 6,725,401 B1 | | 4/2004 | Lindhorst-Ko | 714/47 |
| 6,744,727 B2 | | 6/2004 | Liu et al. | 370/228 |

(Continued)

OTHER PUBLICATIONS

Hungjen Wang, Eytan Modiano, Muriel Medard, Using Local Information for WDM Network Protection, 2002, pp. 1-4, http://www.mit.edu/~modiano/papers/C46.pdf.*

(Continued)

*Primary Examiner*—Zarni Maung

(57) ABSTRACT

A protected communication network utilizes a link-based recovery strategy that includes methods for calculating and distributing link-protection parameters and calculating primary and link-detour paths based on these parameters. These link-protection parameters support the computation of more-optimal link-detour paths and a corresponding increase in sharing of network resources between disjoint failures. A joint-optimization mechanism can be employed that considers both the cost of link-detour paths as well as the cost of links in candidate primary paths in the selection of a primary path for a demand. Information for the joint optimization is preferably distributed using link-state advertisements.

22 Claims, 12 Drawing Sheets

U.S. PATENT DOCUMENTS

| | | | |
|---|---|---|---|
| 6,760,302 B1 | 7/2004 | Ellinas et al. | 370/228 |
| 6,795,394 B1 | 9/2004 | Swinkels et al. | 370/222 |
| 6,807,653 B2 | 10/2004 | Saito | 716/2 |
| 6,850,487 B2 | 2/2005 | Mukherjee et al. | 370/225 |
| 6,856,592 B2 | 2/2005 | Grover et al. | 370/216 |
| 6,863,363 B2 | 3/2005 | Yabuta | 347/19 |
| 6,904,462 B1 | 6/2005 | Sinha | 709/226 |
| 6,982,951 B2 | 1/2006 | Doverspike et al. | 370/217 |
| 7,039,009 B2 | 5/2006 | Chaudhuri et al. | 370/225 |
| 7,099,286 B1 | 8/2006 | Swallow | 370/255 |
| 7,110,356 B2 | 9/2006 | Illikkal et al. | 370/222 |
| 7,133,358 B2 | 11/2006 | Kano | 370/221 |
| 7,164,652 B2 | 1/2007 | Puppa et al. | 370/225 |
| 7,180,852 B1 | 2/2007 | Doverspike et al. | 370/217 |
| 7,188,280 B2 | 3/2007 | Shinomiya et al. | 714/43 |
| 7,197,008 B1 | 3/2007 | Shabtay et al. | 370/218 |
| 7,209,975 B1 | 4/2007 | Zang et al. | 709/238 |
| 7,248,561 B2 | 7/2007 | Ishibashi et al. | 370/228 |
| 7,272,116 B1 | 9/2007 | Houchen | 370/258 |
| 7,280,755 B2 | 10/2007 | Kang et al. | 398/7 |
| 7,308,198 B1 | 12/2007 | Chudak et al. | 398/58 |
| 7,362,709 B1 | 4/2008 | Hui et al. | 370/237 |
| 7,398,321 B2 | 7/2008 | Qiao et al. | 709/239 |
| 2001/0038471 A1 | 11/2001 | Agrawal et al. | 359/110 |
| 2002/0004843 A1 | 1/2002 | Anderson et al. | 709/238 |
| 2002/0067693 A1* | 6/2002 | Kodialam et al. | 370/216 |
| 2002/0071392 A1 | 6/2002 | Grover et al. | 370/241 |
| 2002/0097671 A1 | 7/2002 | Doverspike et al. | 370/216 |
| 2002/0118636 A1 | 8/2002 | Phelps et al. | 370/222 |
| 2002/0174207 A1 | 11/2002 | Battou | 709/223 |
| 2002/0194339 A1 | 12/2002 | Lin et al. | 709/226 |
| 2003/0018812 A1 | 1/2003 | Lakshminarayana et al. | 709/241 |
| 2003/0021222 A1 | 1/2003 | Boer et al. | 370/216 |
| 2003/0037276 A1 | 2/2003 | Mo et al. | 714/4 |
| 2003/0048749 A1 | 3/2003 | Stamatelakis et al. | 370/225 |
| 2003/0065811 A1 | 4/2003 | Lin et al. | 709/232 |
| 2003/0095500 A1 | 5/2003 | Cao | 370/216 |
| 2003/0112760 A1 | 6/2003 | Puppa et al. | 370/241.1 |
| 2003/0147352 A1 | 8/2003 | Ishibashi et al. | 370/248 |
| 2003/0169692 A1 | 9/2003 | Stern et al. | 370/242 |
| 2003/0179700 A1 | 9/2003 | Saleh et al. | 370/216 |
| 2003/0193944 A1 | 10/2003 | Sasgawa | 370/389 |
| 2003/0223357 A1 | 12/2003 | Lee | 370/218 |
| 2004/0004938 A1 | 1/2004 | Buddhikot et al. | 370/238 |
| 2004/0008619 A1 | 1/2004 | Doshi et al. | 370/217 |
| 2004/0042402 A1 | 3/2004 | Galand et al. | 370/237 |
| 2004/0052207 A1 | 3/2004 | Charny et al. | 370/216 |
| 2004/0057375 A1 | 3/2004 | Shiragaki et al. | 370/216 |
| 2004/0114512 A1 | 6/2004 | Johri | 370/225 |
| 2004/0165526 A1 | 8/2004 | Yada et al. | 370/216 |
| 2004/0174882 A1 | 9/2004 | Willis | 370/395.5 |
| 2004/0184402 A1 | 9/2004 | Alicherry et al. | 370/216 |
| 2004/0190445 A1 | 9/2004 | Dziong et al. | 370/225 |
| 2004/0190461 A1 | 9/2004 | Gullicksen et al. | 370/216 |
| 2004/0205239 A1 | 10/2004 | Doshi et al. | 709/241 |
| 2004/0208547 A1 | 10/2004 | Sabat et al. | 398/50 |
| 2004/0233843 A1 | 11/2004 | Barker | 370/225 |
| 2005/0185652 A1 | 8/2005 | Iwamoto | 370/395.1 |
| 2005/0201276 A1 | 9/2005 | Sinha | 370/225 |
| 2005/0232144 A1 | 10/2005 | Doverspike et al. | 370/216 |
| 2006/0013149 A1 | 1/2006 | Jahn et al. | 370/254 |
| 2006/0178918 A1 | 8/2006 | Mikurak | 705/7 |
| 2007/0011284 A1 | 1/2007 | Le Roux et al. | 709/223 |
| 2008/0095045 A1 | 4/2008 | Owens et al. | 370/220 |

OTHER PUBLICATIONS

"Cisco's Packet over SONET/SDH (POS) Technology Support; Mission Accomplished" Copyright 1997. Cisco Systems, Inc. pp. 1-8.

"Optical Network Design and Restoration" by B. T. Doshi, et al., BLTJ, Jan.-Mar. 1999.

"Design of a Meta-mesh of Chain Subnetworks: Enhancing the Attractiveness of Mesh-Restorable WDM networking on Low Connectivity Graphs" by W. D. Grover and J. Doucette, IEEE JSAC, vol. 20, No. 1, Jan. 2002.

"RSVP-TE: Extensions to RSVP for LSP Tunnels" by D. Awduche, L. Berger, D. Gan, T. Li, V. Srinivasan, and G. Swallow; Cisco Systems, Inc. Dec. 2001, pp. 1-47.

"SONET Bidirectional Line-Switched Ring Equipment Generic Criteria," Generic Requirements, GR-1230-CORE, Issue 4, Dec. 1998, pp. 3-48 through 3-61.

"Fast Scalable, and Distributed Restoration in General Mesh Optical Networks" by Gary P. Austin et al.; Bell Labs Technical Journal; Jan.-Jun. 2001; pp. 67-81.

"Optimal Design and Evaluation of Survivable WDM Transport Networks" by Yasuhrio Miyao et al.; IEEE Journal on Selected Areas in Communications, vol. 16, No. 7, Sep. 1998, pp. 1190-1198.

* cited by examiner

CALCULATION OF LINK-DETOUR PATHS IN MESH NETWORKS

CROSS-REFERENCE TO RELATED APPLICATIONS

The subject matter of this application is related to U.S. patent application Ser. No. 10/639,728 filed on Aug. 12, 2003; application Ser. No. 10/673,381 filed on Sep. 26, 2003; application Ser. No. 10/673,383 filed on Sep. 26, 2003; application Ser. No. 10/673,382 filed on Sep. 26, 2003; application Ser. No. 10/673,056 filed on Sep. 26, 2003; application Ser. No. 10/673,057 filed on Sep. 26, 2003; and application Ser. No. 10/673,055 filed on Sep. 26, 2003, the teachings of all of which are incorporated herein by reference.

This application is one of a set of U.S. patent applications consisting of application no. 10/817,748; application Ser. No. 10/817,760; and application Ser. No. 10/817,745, all of which were filed on Apr. 2, 2004 and the teachings of all of which are incorporated herein by reference.

BACKGROUND OF THE INVENTION

1. Field of the Invention

The present invention relates to communications networks, and, more specifically, to mechanisms for calculating recovery paths in mesh communication networks.

2. Description of the Related Art

A mesh communication network includes a set of nodes interconnected by communication links. A path in a mesh network is a set of one or more links connecting a source node to a destination node possibly through one or more intermediate "transit" nodes. Mesh networks that are able to recover automatically from the failure of at least one node or link along paths in the network are considered to be "protected" networks. Recovery mechanisms for such protected networks can be either path-based or link-based.

Path-based recovery is the process of recovering from a failure of one of the links or nodes in a path from a source node to a destination node by rerouting traffic for the entire path along a recovery path. In path-based recovery, the recovery path shares only the source and destination nodes with the original path.

Link-based recovery, on the other hand, is the process of recovering from a single link/node failure by rerouting traffic around the failure using a link-detour path, without rerouting the entire path. A link-detour path is that portion of a link-based recovery path that corresponds to the failure. In many instances, the recovery path for link-based recovery from the failure of a single link is identical to the original path with the exception of the failed link, which is replaced by two or more new links connecting one or more new nodes.

Extensive work has been done on calculating primary paths and their recovery paths (also known as protection paths) for networks that employ path-based recovery (see, e.g., Doshi 58-10-27-19-36). Some work has also been done on calculating link-detour paths for links in primary paths for networks that employ link-based recovery.

SUMMARY OF THE INVENTION

Problems in the prior art are addressed in accordance with principles of the present invention by a protected communication network that utilizes a link-based recovery strategy that employs methods for calculating and distributing link-protection parameters and calculating both primary and link-detour (LD) paths based on these parameters. We have recognized that current solutions for link-based recovery fail to adequately consider the cost of link-detours when calculating primary paths for demands. To some extent, this is a result of a lack of information related to sharing and link state at elements of the network that perform these calculations. As a result, inefficiencies in the use of available network bandwidth and/or the expensive overbuilding of capacity can result in order to meet a desired level of service. In the protected communications network of the present invention, the availability of link-protection parameters at various locations within the network supports the computation of more-optimal primary and LD paths and a corresponding increase in sharing of network resources between disjoint failures.

In certain embodiments, the present invention is a method for selecting both a primary path for a demand and an LD path associated with each link in the selected primary path. This method involves (1) developing a plurality of candidate primary paths for a demand as a function of the available bandwidth on the links of the candidate primary paths, (2) selecting a primary path to carry the demand as a function of a sum of link costs associated with the links of each candidate primary path, and (3) calculating an LD path for each link of the selected primary path as a function of the available shared bandwidth on candidate LD paths. The link costs of the candidate primary path links can be a function of the link costs of LD paths for those primary path links.

In some cases, the link costs of the LD paths can be a function of an administrative weight for the LD path links. In addition or alternatively, the LD path link costs can be a function of the available shared bandwidth and a function of the demand bandwidth. These costs are distributed to portions of the network for use in path calculations. The controlling node for each link of the primary path for which these calculations are performed can be the node that also distributes LD path costs to the rest of the network.

A joint-optimization mechanism can be employed that considers jointly the cost of LD paths as well as the cost of links in candidate primary paths in the selection of a primary path for a demand. In these embodiments, information for the joint optimization can be distributed using link-state advertisements.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
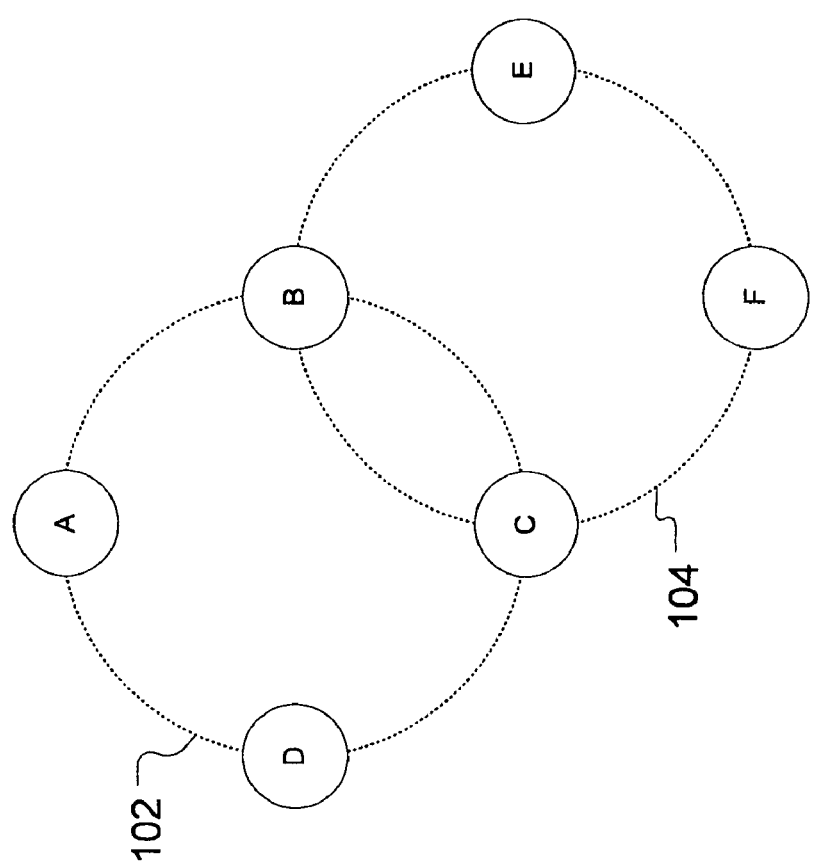
FIG. 1 illustrates two interconnected ring topology networks.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Introduction

Link-based recovery as implemented in the prior art suffers from a number of limitations including inefficient use of bandwidth, backhaul, and a failure to fully address bandwidth-sharing opportunities and recovery management at a granularity that is below the link/port (e.g., wavelength) level.

Recovery Granularity

In optical ring networks of the prior art, the granularity with which link-based protection is implemented is too coarse (e.g., link or line level). Link-based protection of the prior art is provided at a link or line (SONET)/wavelength (WDM) granularity as opposed to the present invention where link-detour paths are computed at a link/line/wavelength/demand granularity.

In the present invention, link-based recovery is managed at a demand granularity. Thus, in anticipation of a failure of a line/port, a separate link-detour path can be reserved for each demand in a line/port. Failure of a line/port or a complete link in the network can thus result in the rerouting of a multitude of affected individual demands along potentially independent recovery paths. In the case of a large demand that spans multiple lines, potentially in separate links (or shared risk links), the flexibility exists to reroute the entire demand in the event of a failure of one of the lines carrying the demand or reroute just the affected line. In general, the flexibility afforded by recovery down to, if desired, the granularity of a demand supports the computation of more-optimal link-detour paths.

Protection Versus Restoration

Recovery mechanisms are often distinguished by the time at which the recovery path is computed and reserved relative to when it is activated. "Protection" typically refers to a recovery mechanism where the paths are computed and reserved in advance of a failure. "Restoration" typically refers to a recovery mechanism where the paths are computed and reserved after a failure has occurred. Although typically slower, restoration can sometimes be more optimal than protection given that more-recent information can be used to route around failed links, nodes, or paths. The present invention can use either or both types of recovery mechanism though protection is preferred.

Sharing and Single-Event Failures

Another problem, associated with some current link-based recovery mechanisms is a failure to take advantage of recovery bandwidth-sharing opportunities. For example, consider topological rings 102 and 104 depicted in FIG. 1. Ring 102 (A-B-C-D-A) (with two units of capacity) and ring 104 (B-C-F-E-B) (with four units of capacity) have the link between nodes B and C (i.e., link B-C) in common. Note that, in this example, the capacity of a ring is limited to the capacity of the link in the ring with the lowest capacity. In accordance with the current SONET and SDH ring standards, ring 102 can use one unit of bandwidth for working traffic, while reserving one unit of bandwidth for protection. Similarly, ring 104 can use two units of bandwidth for working traffic, while reserving two units of bandwidth for protection. Since link B-C is common to both rings and thus carries three units of working traffic, it should reserve three units of protection bandwidth to protect against failures of other links in the two rings. This equates to providing sufficient recovery bandwidth on link B-C to accommodate a failure of at least one link (other than B-C) in each of ring 1 and ring 2 simultaneously.

However, modem-day networks have very high reliability and typically a very fast repair interval (i.e., the time it takes to recover from a single failure, restore service, fix. the failure, and switch back to the original configuration—if that is part of the protocol, or at least reserve new recovery paths based on the modified configuration). In the present invention, this reliability is taken into account by assuming that, since the probability of experiencing a second failure during the recovery interval following an initial failure is insignificant, the probability of two or more co-existing failures can essentially be ignored.

Considering this, reserving separate capacity for each ring, ring 102 and ring 104 in our example, is wasteful of resources. In the above scenario, this equates to the assumption that the reserved bandwidth in the network need only accommodate a failure of a link of ring 102 or a link of ring 104, but not both simultaneously. With this assumption, the bandwidth reserved on link B-C to cover a single failure on this two-ring network need only be two units (as opposed to three). In the event of a failure of any one of the other links of ring 102, one unit of the reserved bandwidth along link B-C can be used for recovery purposes. Similarly, in the event of a failure of any one of the other links of ring 104, both units of the reserved bandwidth along link B-C can be used for recovery purposes. Thus, the recovery bandwidth reserved on link B-C is shared between the two rings, yielding a more efficient use of network resources.

Finally, as another example of the flexibility afforded by link-based recovery at a demand granularity, in the case of a failure of link B-C, each demand on link B-C could be recovered along a different detour path, where in this example, the possible detours paths are B-A-D-C and B-E-F-C. Related information on path-based recovery bandwidth sharing among multiple disjoint failures in the context of wavelength connections in optical rings can be found in B. T. Doshi, S. Dravida, P. Harshavardhana, O. Hauser, Y. Wang, "Optical Network Design and Restoration" BLTJ, January-March 1999, incorporated herein by reference in its entirety. More information on BLSR and MS-Spring can be found in BLSR-GR-1230-CORE, SONET Bidirectional Line-Switched Ring Equipment Generic Criteria, and International Telecommunications Union (ITU) G.841 (SDH) "MS-Spring, types and characteristics of SDH network protection architecture," February 99, each incorporated herein by reference in its entirety.

Preferred Embodiments

The following embodiments are included to illustrate the concepts of the present invention. Though these examples present preferred implementations in particular contexts, they should not be construed as limiting the scope or intent of the present invention.

Link-Based Recovery at the Demand Level

One embodiment of the present invention is a link-based recovery scheme for SONET/SDH networks where the link recovery and sharing are provided at the SONET/SDH tributary demand level. This is a finer granularity than either the SONET line or wavelength level. In one or more embodiments of the present invention, each tributary demand within a SONET line can be protected independently of the others. This means that tributary demands to the same SONET line may have different protection paths associated with them.

For example, referring again to the network of FIG. 1, assume there are two 5 Mbps demands on the network. One demand is carried along path A-B-C, the other is carried along path F-E-B-C. Thus, both demands have primary paths that include nodes B and C. Further suppose both demands are routed within the same line between nodes B and C. In the prior art, in the event of a failure of that line on link B-C, all the traffic on the failed line would be redirected to one alternate path, for example, B-A-D-C or B-E-F-C in a link-based recovery scheme that was limited to line-level granularity. In the present invention, however, each demand carried on link B-C can have its own protection path. In the event of a failure of link B-C, each demand can be routed along a different path if it is beneficial to do so. For example, the first demand can be routed along protection path B-A-D-C, and the second demand can be routed along path B-E-F-C. Alternatively, the first demand could be routed along B-E-F-C, and the second demand routed along B-A-D-C. Of course, within the present invention, the flexibility of routing both demands along the same recovery path is retained as well.

Elimination of Backhauling

Figure 2:
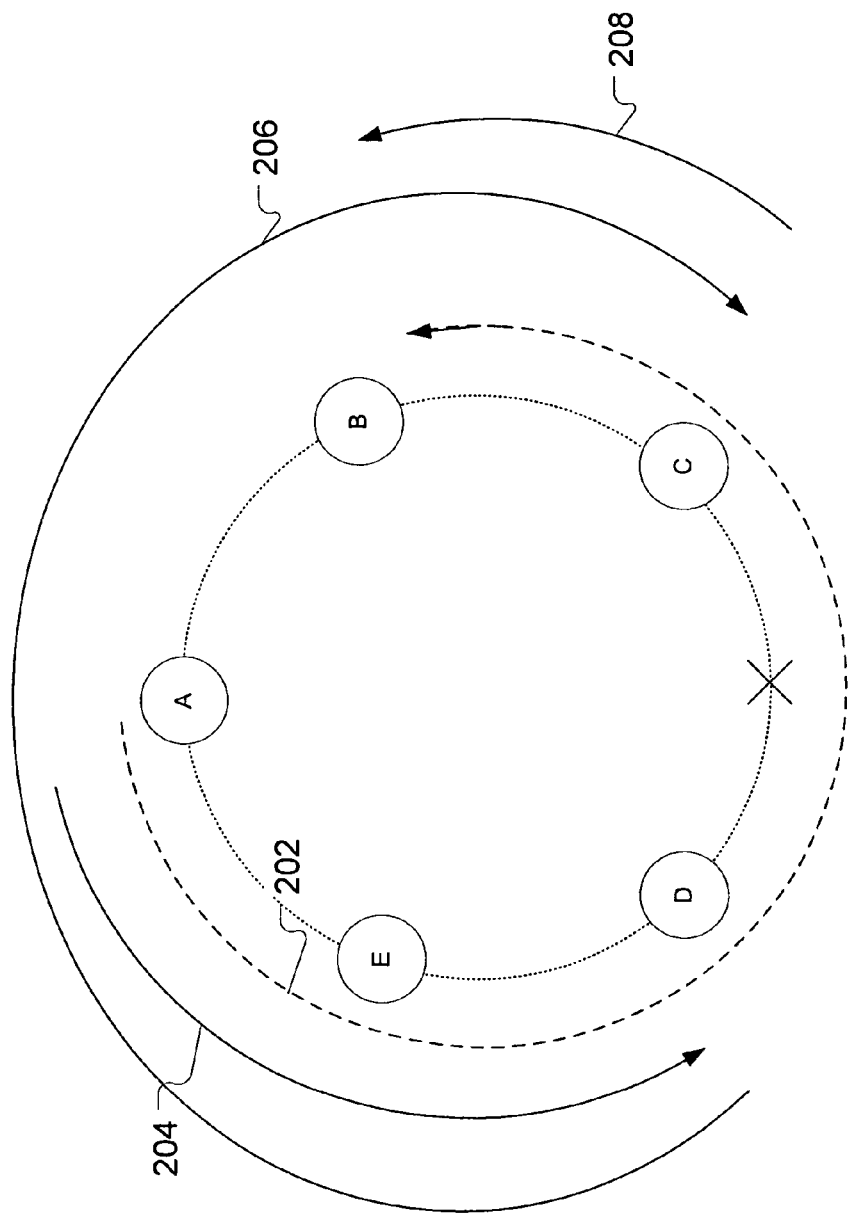
FIG. 2 illustrates a network formed from nodes A, B, C, D, and E are connected in a topological ring.

Another aspect of the present invention is that it avoids any unnecessary backhauling of traffic in the network. Backhauling occurs when traffic ends up unnecessarily traversing the same link twice, resulting in waste of recovery bandwidth. Backhauling can easily occur if no special attention is given to the network topology/connectivity. For example, consider a network as illustrated in FIG. 2 where nodes A, B, C, D, and E are connected in a ring topology, forming ring A-B-C-D-E-A. Assume that nodes C, D, and E have no other connected links or nodes in the network other than those illustrated. This means that there is just one shortest detour (C-B-A-E-D) between nodes C and D that can avoid traversing link C-D.

Now consider a demand 202 from node A to node B whose primary path, for some reason, is A-E-D-C-B. Assume that the demand is recovered by link-based recovery mechanisms, where the detour for link D-C is the path D-E-A-B-C. In this case, if link D-C fails, traffic for demand 202 will flow along the primary path segment A-E-D (204), followed by flow along the detour path D-E-A-B-C (206), followed by flow along the primary path segment C-B (208). In this case, traffic will flow along links A-E, E-D, and B-C twice. This backhauling can be avoided if the protection scheme detects the backhaul while computing the protection paths and avoids the backhaul by moving the protection switching functions. In the present example, backhauling can be avoided by moving the protection switching function to nodes A and B. To accomplish this, the present invention can incorporate additional bookkeeping and signaling that allow the computation and selection of the appropriate switching nodes for protection.

Precomputation of Protection Cross-Connect Tables

To achieve fast protection comparable to that of SONET/SDH ring protection, embodiments of the present invention include computation of cross-connect tables per failure per node in advance of a failure. This comes at the cost of more data management but avoids having to allocate cross-connects at the time of failure. Further, this allows triggering of protection signaling from both sides of a connection since the cross-connects at each node along the detour are already computed, reserved, and known in advance of the failure.

Bundling of Signaling Messages

Embodiments of the present invention also feature bundling of signaling messages. In this scheme, failure indication for all the demands affected by a single line/port failure that will be recovered along the same detour path can be bundled in a single recovery message. This reduces the number of recovery messages that need to be processed in the network.

Exemplary Procedure

Figure 3:
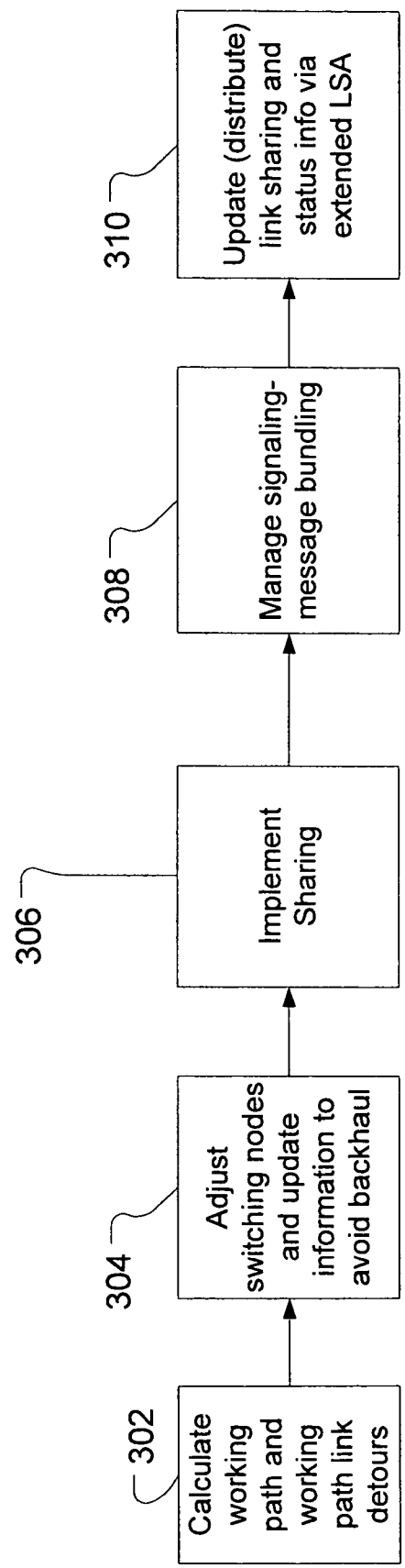
FIG. 3 illustrates an exemplary process for achieving link-based protection at the demand level.

FIG. 3 depicts an exemplary process for achieving link-based protection at the demand level. As shown, in step 302, a working path for a new service is computed along with protection paths for each link in the working path. In order to admit a new service into the network, there should be sufficient capacity in the network to admit the new service along the working path and also guarantee the service's recovery from any single failure along its route.

In step 304, to avoid backhaul, the recovery-switching nodes for recovery of each link in the working path are adjusted so that, for example, no links in the recovery path of a failed link are traversed more than once and no links in the recovery path for the failed link are part of the original primary path. Alternatively or additionally, backhaul is eliminated by a recovery-path calculation mechanism that eliminates redundant traversal of any one link and reassignment of the recovery-switching function to nodes appropriate to the backhaul-free path. Once the recovery-switching nodes are adjusted, state information is updated to reflect the new detour node locations.

Next, in step 306, sharing between disjoint link failures is achieved by determining, via bookkeeping information, the amount of protection bandwidth that would need to be reserved on each link for recovering demands affected by any single other link failure in the network. Recovery of each other link may require a different amount of capacity. On each link that is part of a recovery path, the maximum of required recovery capacities required on that link is calculated. This maximum is then reserved on the link if sufficient capacity exists on the link. For a distributed implementation, each node keeps track of this sharing information for each of its incident links. Signaling is used to update this sharing information with admittance of every new demand into the network. In the case of SONET/SDH networks, the reservation information is kept in terms of time slots associated with the demands, though other schemes are possible.

In step 308, each upstream node to a link keeps track of the demands on that link that use the same line/port and have the same link-detour path. Signaling messages for these connections are bundled whenever possible by the upstream node to save signaling bandwidth.

Finally, in step 310, link status and sharing information is passed to nodes in the network using an appropriate link state advertisement (LSA)-based routing protocol.

Calculation of Primary and Link-Detour Paths

Embodiments of the present invention may include a distributed method for calculating primary and link-detour paths in a mesh network. This method improves the number of connections admitted to a network and reduces the probability of crank-backs due to unavailable or overutilized link-detour paths. A crankback is the failure to establish either a primary or protection path based on the unavailability of resources that were anticipated to be available. A crankback can occur, for example, during the reservation of bandwidth along a calculated protection path for a link. A source node may assume that bandwidth for a new connection is available, and then start to signal to establish the primary path and link-detour paths for the connection. However, during the process of establishing those paths, it might be found that one of the links along the paths cannot support the required bandwidths. In this case, the paths need to be ripped up and the signaling "cranked back" to the originating source node, which needs to try an alternative path. Crankbacks can be very undesirable because of the delay associated with them. Improvement in the number of connections admitted to the network results from a link-detour path-calculation method that increases sharing of the recovery bandwidth and a primary-path calculation method that is a function of the link-detour costs.

Link-Protection Path Calculation

In embodiments of the present invention, link-detour path calculation involves maximizing sharing of link-detour bandwidth. The recovery-path calculation algorithm makes use of information including how much bandwidth can be-shared at each link in the network. This information is obtained by advertising, across the network, the amount of bandwidth reserved for recovery on each link and by bookkeeping, in each node, information about all recovery paths that would be activated when a protected link fails.

Primary-Path Calculation

The primary path is calculated by taking into account the link cost and constraints that take into account the costs and constraints of link-detour paths for each link in the primary path. The link-detour path cost and constraints for each link are distributed to each node by an advertising protocol.

Figure 4:
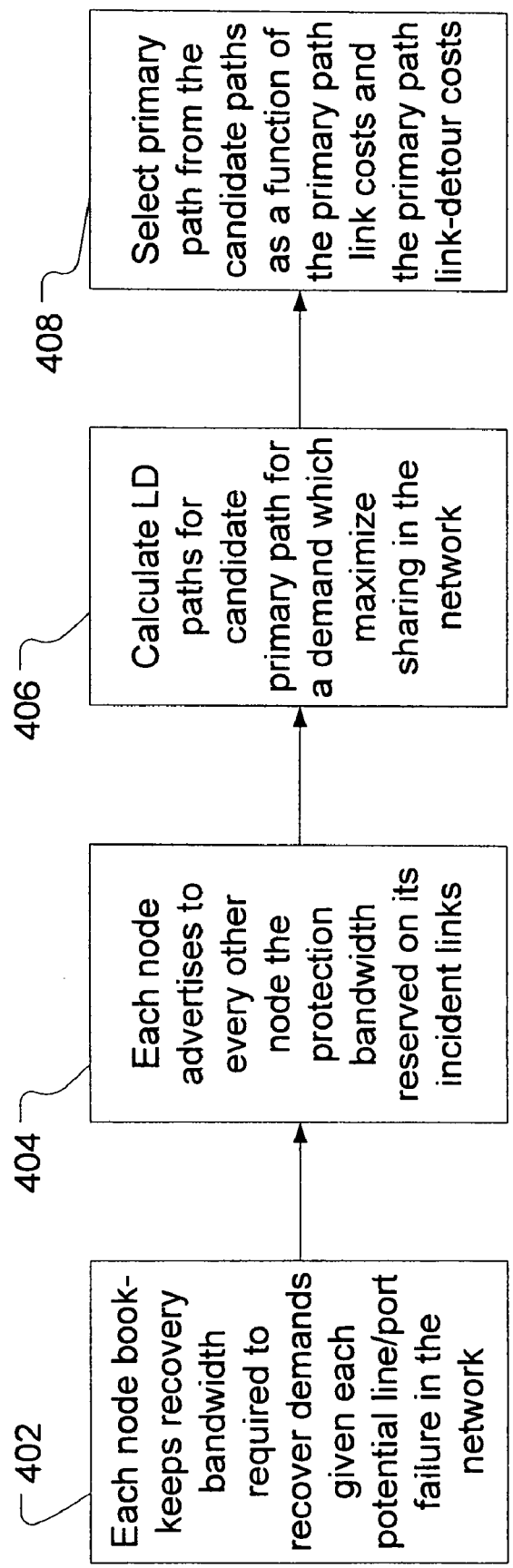
FIG. 4 depicts a process for calculating primary paths and link-detour paths according to one embodiment of the present invention.

FIG. 4 depicts a process for calculating primary paths and link-detour (LD) paths according to one embodiment of the present invention. In step 402, each node in the network does bookkeeping for each of its incident links of the amount of protection bandwidth that is needed to recover service in the event of each potential link failure in the network. The amount of bandwidth actually reserved on each incident link is the maximum of the bandwidths required to recover from any of the failures.

In step 404, each node in the network advertises to other nodes in the network the amount of protection bandwidth it currently has reserved on each of its incident links.

In step 406, an LD path for each link in a set of candidate primary paths for a new demand is calculated in such a way that sharing in the network is maximized (e.g., by summing the cost of each link in each candidate LD path, where the cost is an inverse function of the degree to which the protection bandwidth for that link can be shared with other links in the network, and by choosing the path with the lowest cost).

Next, in step 408, the primary path for a new demand is selected from the set of candidate primary paths by considering not only the cost of the links in each primary path but also the cost of the LD paths for each link in the primary path.

Link-Based vs. Path-Based Shared Protection

Path-based shared recovery has been utilized in mesh networks to improve the efficiency and recovery speed of communications networks. More information on path-based shared recovery can be found in Z. Dziong, S. Kasera, R. Nagarajan, "Efficient Capacity Sharing in Path Restoration Schemes for Mesh Optical Networks," NFOEC 2002 (herein "Dziong '02"), and in co-pending applications Lucent-1-Lucent-6 referenced above. However, a generic link-based shared-recovery approach can provide effective resiliency mechanisms that are competitive with other solutions, such as ring-based protection, from both a bandwidth efficiency and a recovery time perspective.

While some of the algorithms utilized in a link-based scheme are related to path-based recovery algorithms, there are significant modifications and special considerations that are made in the case of link-based recovery.

Figure 5:
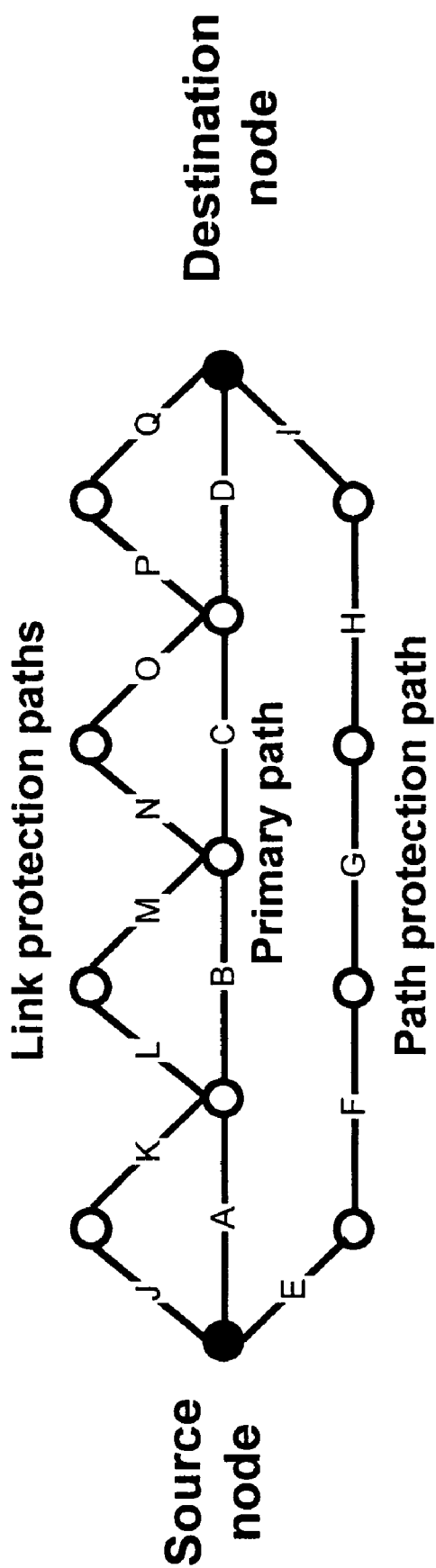
FIG. 5 illustrates a simple network with both path-based and link-based recovery paths.

FIG. 5 illustrates a simple network with both path-based and link-based recovery paths. For path-based recovery, two link- and node-disjoint paths between the source and destination nodes are shown. One is primary path A-B-C-D and the other is recovery path E-F-G-H-I. For link-based recovery, each link on the primary path has its own link-detour (LD) path that is defined by its source node (the link's upstream node), its destination node (the link's downstream node), and a set of transit nodes. For example, in the case of a failure of link A, demands that were carried on that link can be rerouted to LD path J-K. Alternatively, though much less efficiently, demands on link A could have been rerouted along LD path E-F-G-H-I-D-C-M-L. Other alternative routes could also be used, contingent on any hop limit imposed on the network. In the present invention, it is assumed that a failure can affect an entire link, part of a link (e.g., one or more lines/ports that are part of the link), or several links. The links or the lines/ports that are likely to be affected at the same time are grouped into a shared-risk link group (SRLG). In general, SRLGs can overlap each other.

Link-Based Shared Restoration

Different embodiments of the present invention employ a variety of link-based recovery mechanisms that trade off bandwidth efficiency with implementation complexity and cost. The framework is defined by the following assumptions:
 a) Recovery paths are calculated for each connection separately,
 b) Recovery is guaranteed for a single failure, and
 c) Recovery bandwidth is shared among different shared-risk link groups.

Note that, although optical or SONET network examples are used in various discussion herein, the present invention can be applied to networks based on different technologies and topologies, including wired/wireless, optical/electrical, and mesh topology.

General Link-Based Protection Framework

Link protection can be implemented in different ways. The choice is usually driven by the following objectives:
 a) Recovery speed comparable with rings,
 b) Recovery guaranteed for one SRLG failure at a time,
 c) Bandwidth efficiency better than that of rings, and
 d) Scalability.

The objectives of recovery speed and guaranteed recovery for no more than one SRLG failure at a time imply that the recovery paths should be reserved in advance. Although the terms "restoration" and "protection" are often used interchangeably in the art, herein, advance reservation schemes are referred to as "protection" schemes, and schemes where alternative paths for services are calculated after a link's failure are referred to herein as "restoration" schemes. Using this distinction between restoration and protection, the paths calculated for link protection herein will generally either be referred to as protection paths or recovery paths, although it should be understood throughout that the alternative of post-failure reservation within the scope and intent of the present invention.

In the present invention, link-recovery mechanisms can be implemented with different reservation granularities varying from reservation per link/fiber/line/port to reservation per demand/connection/service. All these choices are viable from a bandwidth efficiency viewpoint since, although the flexibility exists in the present invention to route each demand along a different LD path, demands can still be routed along common LD paths if so desired from a bandwidth flexibility perspective. Still, the choice of granularity has an impact on implementation complexity, bandwidth efficiency, and restoration speed. While each of the alternatives has some advantages and disadvantages, a preferred embodiment of the present invention involves reservation per demand that provides:

i) Flexibility that supports different recovery services for each customer,
ii) Bandwidth efficiency associated with the use of diverse link-detour paths for demands within the same link or even the same line/port, and the ability to reserve only the required amount of bandwidth for recovery, and
iii) Avoidance of unnecessary connection disruptions if the connection is carried on a line/port that is not affected by the failure but would be switched anyway due to reservation granularity coarser than a single line/port.

Figure 6:
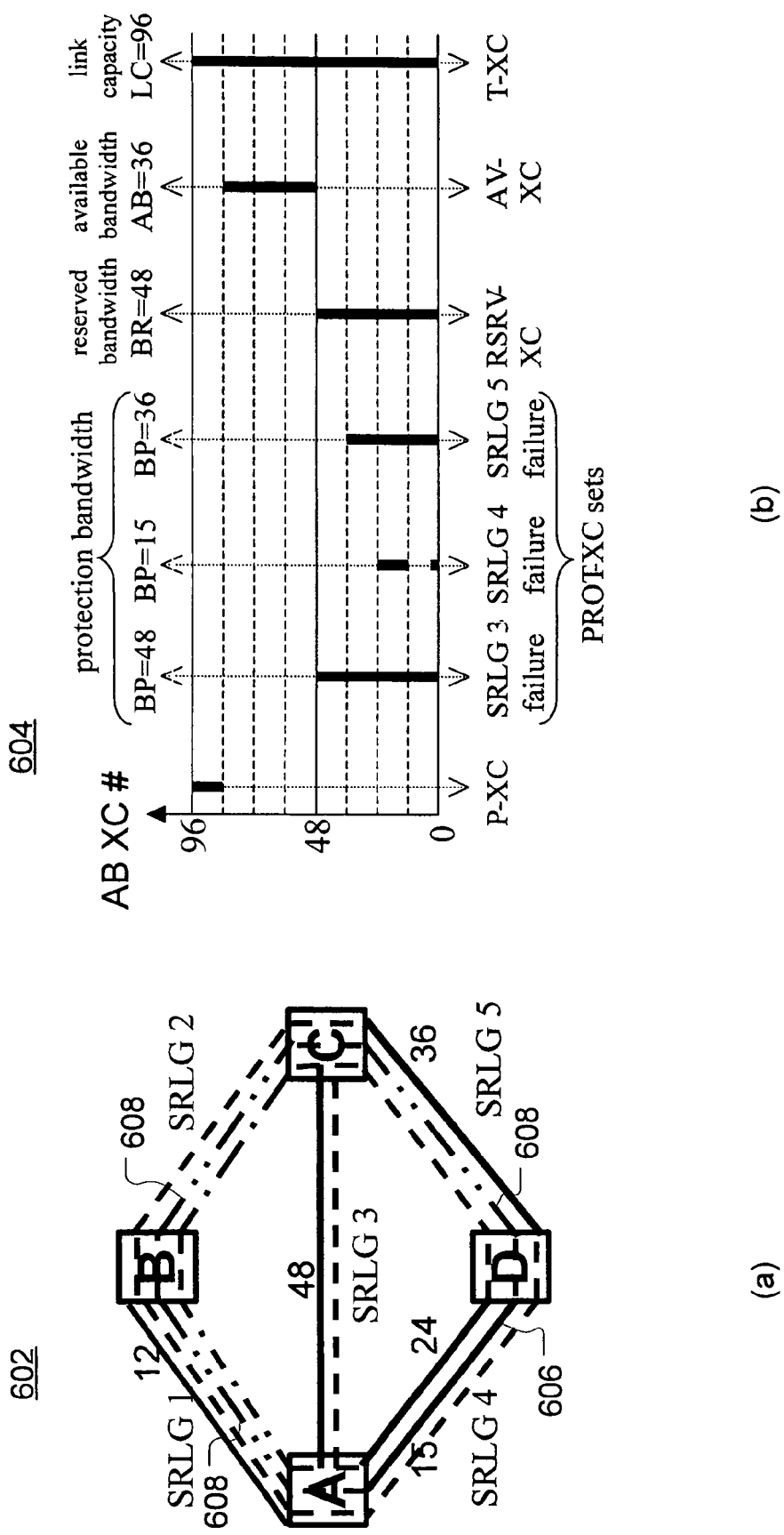
FIG. 6 illustrates an exemplary optical/SONET network and a corresponding bandwidth reservation table for one of its links.

To achieve bandwidth efficiency better than that of rings, recovery bandwidth sharing is considered between different single-event failures. In other words, the bandwidth reserved for recovery of a particular SRLG can be shared with bandwidth reserved for recovery of other disjoint SRLGs, since it is assumed that only one failure at a time will occur. FIG. 6(a) illustrates an exemplary optical/SONET network 602 and FIG. 6(b) shows bandwidth reservation table 604 for link A-B of FIG. 6(a).

In network 602, each solid line represents all of the demands that have the same link-detour path, which is represented by a corresponding broken line. For example, solid line 606 in SRLG 4 corresponds to one or more demands totaling 15 units of bandwidth between nodes A and D. Broken lines 608 between nodes A and B, nodes B and C, and nodes C and D correspond to the common link-detour path for those demands.

Bandwidth reservation table 604 describes the current state of the bandwidth of link A-B in terms of cross-connection (XC) units. In particular, "P-XC" represents the number of XC units in link A-B that currently support demands (i.e., 12 units in this example). "SRLG 3 failure" represents the number of XC units in link A-B that are reserved to protect demands on SRLG 3 (i.e., 48 units). Similarly, "SRLG 4 failure" and "SRLG 5 failure" represent the numbers of XC units in link A-B that are reserved to protect demands on SRLG 4 (i.e., 15 units) and SRLG 5 (i.e., 36 units), respectively. Note that link A-B is not part of the link-detour path for the other 24 XC units of demand on SRLG 4 (i.e., represented by solid line CE).

Table 604 is based on the assumption that protection bandwidth is shared for SRLG-disjoint failures. As such, RSRV-XC represents the actual amount of bandwidth that needs to be reserved on link A-B to protect against any one SRLG failure in network 602. In the current example, this corresponds to the maximum of the protection bandwidths required by each of SRLGs 3, 4, and 5 protected by link A-B (i.e., 48 units). Thus, link A-B provides protection bandwidth that is shared between disjoint SRLGs 3, 4, and 5.

The example shows one-link-long connections and their protection paths that, in effect, illustrate link-based protection concepts. Because these primary paths are only a single link long, calculation of bandwidths reserved for protection in this case could be done using the same mechanism used for path protection as discussed in Dziong '02. In general, this will not be the case.

To calculate bandwidth reserved on each link for protection, the node controlling the link book-keeps information about the bandwidth needed to protect each SRLG. To support this, when the source node of a protection path sends a message along that path to make a reservation, it also includes information about the protected SRLG.

The calculation of primary and protection paths can be done in several ways that influence several performance characteristics such as scalability, bandwidth efficiency, and number of crank-backs. There are three main issues associated with this problem: path calculation architecture, algorithms for calculation of protection paths, and algorithms for calculation of primary paths.

Centralized Calculation

Recovery-path calculation can be centralized or distributed. In a centralized solution, the path calculation is performed in a specialized server that keeps track of all connection states. When a new connection demand arrives at a source node, a request is sent to the server to calculate the primary path and associated protection path(s). Once the server calculates the paths, this information is sent back to the source node. The main advantage of this option is that the path calculation algorithms have exact information about link and connection states so that optimal paths can be calculated and crank-backs avoided. Nevertheless, these advantages have to be weighed against several drawbacks such as scalability limits, calculation delays, sensitivity to server failure, and design of an additional network element that needs very reliable communication with all other network elements.

Distributed Calculation

An alternative to centralized solution is a distributed implementation where paths are calculated in their respective source nodes. Such a solution has the advantage of being much more scalable and resilient to network element failures. While a distributed implementation avoids signaling to a centralized server, it requires an advertisement protocol that distributes information about link states across the network. Such link-state advertisement (LSA) protocols are usually already present in communications networks to support primary path calculations. However, some extensions may be required in order to advertise information about link bandwidth sharing capabilities, and, in the case of link recovery, link-recovery costs.

Figure 7:
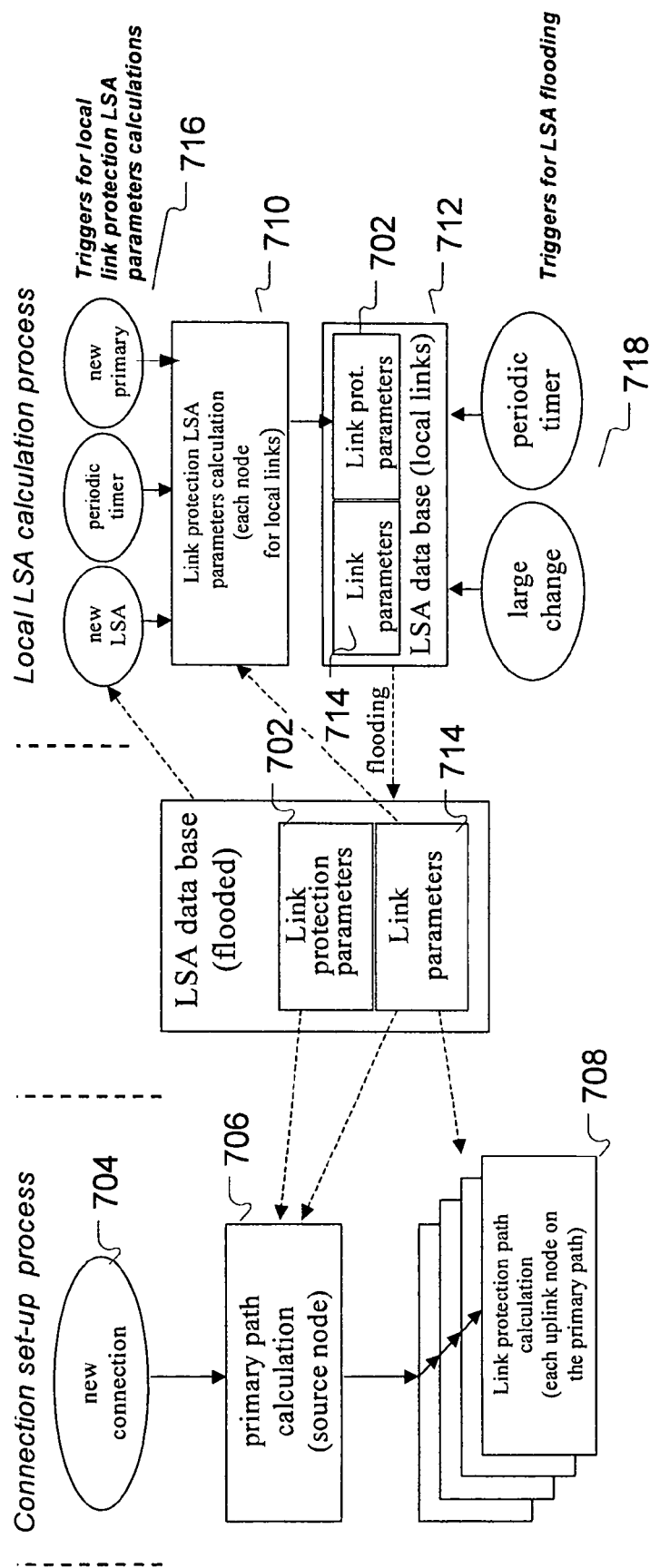
FIG. 7 illustrates a generic LSA data flow for a link-based protection mechanism.

FIG. 7 illustrates a generic LSA data flow in such an environment for the link-based protection mechanism. This flow is more complex than the equivalent flow for path protection since it includes the addition of the link protection path parameters (702). More details on these and other parameters to be advertised are given in the next section where path calculation algorithms are described. As illustrated, the link protection process can be divided into two main parts. These are the connection setup process, which includes steps 704, 706, and 708, and the local LSA calculation process, which includes steps 710, and 712. The connection setup process starts with a request for a new demand in step 704. This is followed by primary path calculation for the new demand in step 706 using link and link-protection parameters 714, and 702, respectively. Then, in step 708, making use of link parameters 714, at each node along the primary path, the protection path for the downstream link connected to that node is calculated. Upon the occurrence of an LSA update trigger (716) (e.g., a new primary path in the network, a new global LSA update, or the expiration of a periodic timer) each node performs LSA link-protection parameter calculations (for each of its incident nodes) and in step 712, each node updates the link-protection parameters in its local link-protection database. Finally upon the occurrence of a large change in services on the network or other periodic timer (718), the new LSA database is flooded to the network.

Protection and Primary Path Calculations

The calculation of primary and protection paths for path protection was discussed and presented in Dziong '02. For link-based protection, it is of interest to provide node- and link-disjoint paths that are bandwidth efficient. Two generic approaches are possible. The first approach assumes the same link weight for both the primary and protection paths. In this case, an algorithm can be implemented that provides a minimum-cost solution, but compromises bandwidth efficiency by not taking into account sharing opportunities. In the second approach, the algorithm takes into account link-sharing opportunities. This second approach raises two additional issues. First, the link-sharing abilities should be advertised in the distributed implementation. This results in an increased signaling load in the network. Second, the link cost can be different for primary and protection paths. This feature makes optimal solution time-consuming in real-time and therefore a heuristic is preferred as proposed in Dziong '02.

Recovery Path Calculations

In some areas, the issues associated with recovery path calculation for link-based recovery is analogous to recovery path calculations for path-based restoration that was described in Dziong '02. In particular, two generic approaches can be considered.

In the first, the recovery path is calculated using the same link-state database and link-cost function as the ones used for primary path calculations. Assuming that the primary path was already calculated, a shortest-path algorithm can be used for calculation of a minimum-cost link-detour path after excluding the protected link from the network topology. In this case, the LD path calculation does not take into account the sharing capabilities of links, and therefore sharing is not optimized. Still, some degree of sharing can be achieved by proper bookkeeping of the reserved recovery paths at the nodes controlling the links. Another disadvantage of this approach is that link i considered for the protection path of a protected link j should have available bandwidth $AB_i$ at least as large as the protected connection bandwidth CB (i.e., $CB \leq AB_i$), since the sharing capability of the reserved bandwidth for protection is unknown.

As a consequence, in some cases, a request for a protection path for a link can be rejected due to lack of available bandwidth on a candidate protection link, while, in reality, it could have been established using available shared bandwidth reserved for protection on that link for a disjoint failure. Still, this option has the advantage of being simple and consistent with primary path calculation approaches.

Available Shared Bandwidth (ASB)

In the second approach, a link's detour path is calculated using link-state and link-cost functions that take into account link-sharing capabilities. In this approach, the reservation for a new LD path can use both a protection link's available bandwidth and the protection link's available shared bandwidth ASBI. In this case, the link bandwidth constraint is given by:

$$CB < AB_i + ASB_i$$

To calculate available shared bandwidth on link i, two additional link parameters are needed. First, link i bandwidth reserved for all LD paths using this link $BRP_i$, should be known. Note that, in the case of a distributed implementation, this information should be advertised throughout the network so that each potential LD path source node has this information for all links in the network. The source node also should have information about the link i protection bandwidth $PB_i^j$ already reserved (in support of other connections) for the failure of link j for which the protection path is calculated. In this case:

$$ASB_i = BRP_i - PB_i^j$$

Note that the value of $PB_i^j$ is available locally at the protection path source node since this node has to keep track of all connections on link j anyway. The bandwidth $PB_i^j$ is subtracted from the total reserved protection bandwidth on link i because it is not available for sharing with additional connections protected on link j since all the connections on link j are considered (for the present discussion) to fail in common with the link failure and thus simultaneously require protection in an additive manner. This feature is of importance when compared with path protection schemes where such information is not available in the protection path source node and has to be advertised throughout the network based on local protection bandwidth bookkeeping (see Dziong '02).

This advantage of link protection vs. path protection is straightforward when an SRLG consists of one link. When the k-th SRLG consists of more than one link, the available shared bandwidth is given by:

$$ASB_i = BRP_i - PB_i^k$$

where $PB_i^k$ corresponds to protection bandwidth needed on link i in the case of a failure of all links belonging to SRLG k. If all links belonging to SRLG k originate in the protection path source node, the value of $PB_i^k$ is still available at the source node. A problem arises when the links from SRLG k originate in different nodes. In these cases, the protection path source node does not have sufficient information to calculate $PB_i^k$. One possible solution is analogous to the one proposed in Dziong '02 for path protection. Namely, the node controlling link i performs bookkeeping of $PB_i^k$ for all SRLGs using link i for protection in order to calculate bandwidth reserved for protection bandwidth. Therefore, these values can be advertised throughout the network so that the protection path source node has the information it needs to calculate the sharing capabilities for all links.

Link-cost Function

Depending on the path calculation objective, the link-cost function can take into account several metrics including: administrative weight (which can be considered as a link bandwidth unit cost), available bandwidth, and delay. In the following discussion, maximization of bandwidth utilization is the focus, where the metrics of importance are administrative weight, available bandwidth, and available shared bandwidth. When LD path calculation is based on available bandwidth only, the conservative approach is to assume that the LD path will need additional reservation of CB, since the available shared bandwidth is unknown. In this case, the link-cost function should be the same as for the primary path calculations.

In general, one can consider a static link-cost function, such as administrative weight AW, or a dynamic link-cost function that depends on available bandwidth. A dynamic non-sharing link-cost function (the cost of available bandwidth CAB) can be based on the inverse of available bandwidth as proposed in Dziong '02:

$$LC_{NS} = CAB = \frac{CB \cdot AW}{AB^a}$$

where a is a numerically chosen factor. The inverse of available bandwidth factor provides better load balancing in the network that in turn can improve bandwidth utilization and access fairness.

While the above formulations define the cost of the link available bandwidth, the question arises as to what should be the link-cost function for the link available shared bandwidth. First, it should be noted that there is no immediate cost for new protection path reservation using ASB, in terms of bandwidth. Therefore, at that instant of reservation, the link cost could be assumed to be zero. Nevertheless, by using a Markov decision theory framework, one can find that there is a certain cost. This follows from the fact that the cost should be considered during the whole connection-holding time. So, even if, at the moment of connection arrival, sharing is possible, in the future, with some probability, the other connections can be terminated, and the new connection will be the sole occupant of the reserved bandwidth and hence incurs a cost for reserving additional restoration bandwidth. Also, consuming the available shared bandwidth increases the probability of use of available bandwidth by some future protection paths. While exact calculation of such a cost is complex, one can apply an approximation (the cost of shared bandwidth CSB) similar to that presented in Dziong '02:

$$LC_S = CSB = \frac{CB'}{1 + b \cdot ASB} \cdot \frac{AW}{AB^a}$$

where CB' is the portion of the connection bandwidth that can be accommodated using the available shared bandwidth of the link, and b>1 is a numerically chosen coefficient that reduces the available shared bandwidth cost compared to the cost of available bandwidth.

Path Calculation and Loop Avoidance

Assuming link-cost and link-state information is available, one LD path calculation approach involves removal of the protected link from the network topology before application of a shortest-path algorithm to the source-destination pair. Nevertheless, this approach has one potential drawback. Namely, in the case of a failure, the link protection path combined with the still active part of the primary path can form a loop that can be seen as an unnecessary waste of bandwidth. Such a situation can happen quite often especially in sparse networks where some nodes have only two adjoining links.

Figure 8:
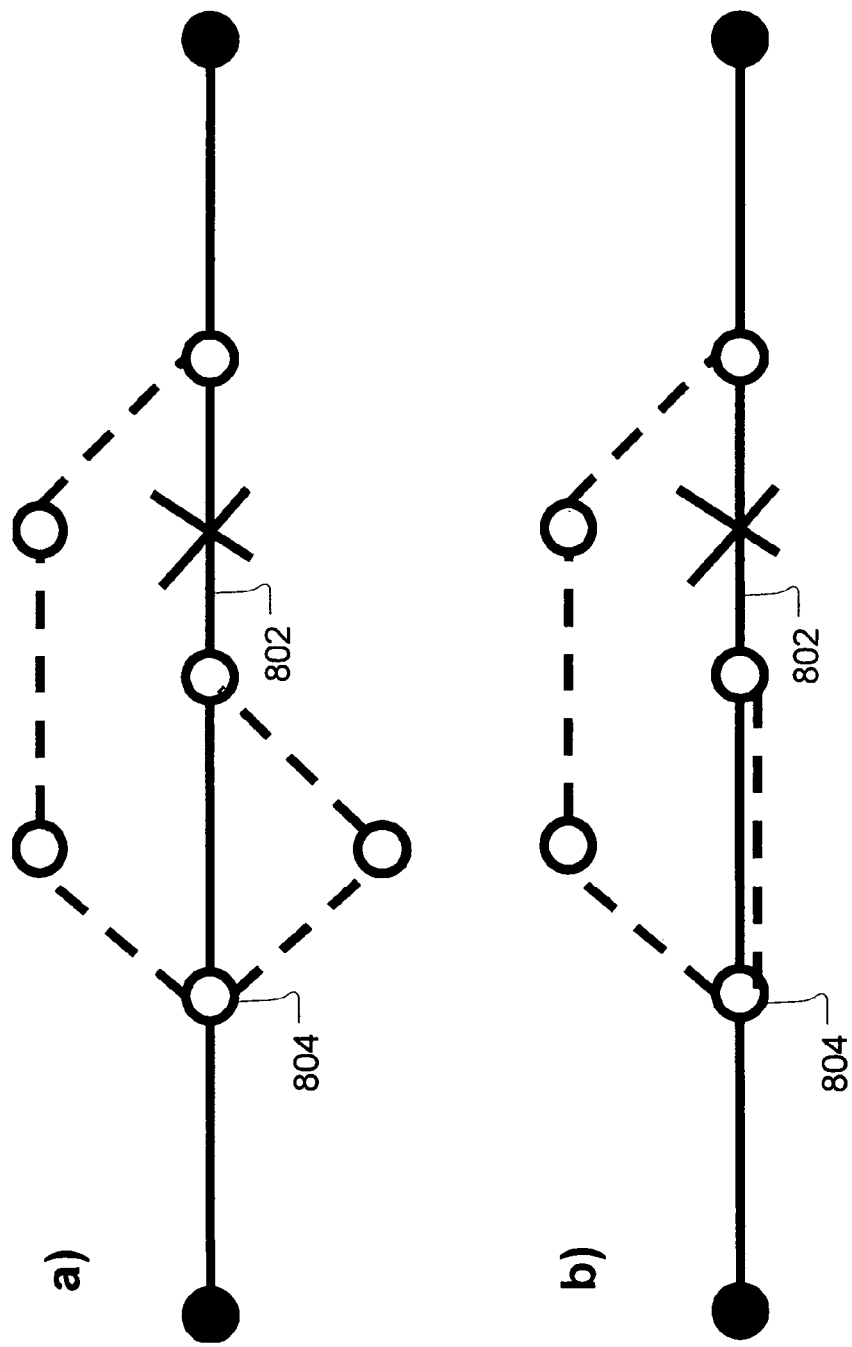
FIG. 8 illustrates loop issues in mesh networks.

FIG. 8 illustrates some loop issues. For example, in both FIGS. 8(a) and 8(b), a failure of link 802 results in routing of traffic (indicated by broken lines) around the failed link in a less than optimal fashion. Note that, in each case, an ideal detour path would involve protection switching for the link-detour path occurring at node 804.

In general, loop avoidance can be realized in several ways. In a distributed embodiment, it is assumed that the protected link's immediately upstream node is in control of calculation, reservation, and activation of the protection path for the link. In one embodiment, a link protection path is calculated without any considerations of loops. If a loop is subsequently detected, by comparing the LD path with the primary path, the algorithm defines the branching and merging nodes of the shortened-LD path as the nodes common to primary and link protection paths that are closest to the primary path source and destination nodes, respectively. Then, the reservation message, sent from the upstream node along the protection path, reserves bandwidth only on the links belonging to the shortened-LD path. When the link fails, the recovery message, sent from the upstream node along the shortened-LD path, activates connections between the primary and shortened-LD paths in the branching and merging nodes as well as connections in the transit nodes of the shortened-LD path.

Additional gain in bandwidth efficiency can be achieved by enhancing the LD path calculation. This can be obtained by first marking the primary links as no-constraint links with link cost equal zero. Then, after calculating the LD path and subtracting the primary links from the solution, the outcome defines the least-expensive, shortened-LD path.

Joint Optimization of Primary and Protection Paths

In non-joint optimization embodiments of the present invention, the primary path is calculated using a shortest-path algorithm that minimizes the path cost and meets the bandwidth constraints (CB<$AB_i$) for each link i in the primary path. Then, the protection paths can be optimized for a given primary path using one or more of the techniques described above.

In joint-optimization embodiment, a more optimal solution calculates and optimizes both the primary and protection paths at the same time. This approach was applied in Dziong '02 for path protection. In the case of link protection, the issue of joint optimization is much more complex due to the multitude of link detour paths. Moreover, in the case of distributed implementation, it is more straightforward to calculate the link detour paths in the controlling nodes for the primary path links and calculate the primary path in the connection source node. Still, a joint optimization has the advantage of increasing bandwidth efficiency and reducing the number of crank-backs.

The following discussion describes a joint-optimization embodiment of the present invention where joint optimization is performed in a distributed fashion. In this embodiment, the primary path calculation takes into account some advertised attributes of the link-detour path, but the paths are still calculated in the respective upstream (i.e., controlling) nodes of each protected link.

Throughout this document, a controlling node for a link is defined as the node that is immediately upstream to a link relative to a given primary demand. A controlling node calculates and distributes a link-detour path cost $CPP_i$ and keeps track of the available bandwidth for protection $ABP_i$ on the link detour path for a link i along the primary path. (Note that a node in the network may have many incident links for which it serves as a controlling node). The aforementioned function of a controlling node can be done either by using information from the last link detour path calculation, by periodic calculations, or by a combination of the two. This information is then periodically advertised to all other nodes together with other link-state parameters as illustrated in FIG. 7. When the connection source node calculates the primary path, the link constraints and link cost are modified. In particular, each link considered for the primary path has to fulfill the bandwidth constraint for the primary connection:

$$CB \leq AB_i$$

and the bandwidth constraint for the link detour path:

$$CB \leq ABP_i.$$

The link cost for joint optimization then has two components, one associated with the primary path links and the other associated with the link detour paths:

$$LC_i = CAB_i + CPP_i.$$

Note that the cost of a link detour path can be a non-linear function of connection bandwidth. This follows from the fact that the available shared bandwidth can be smaller than the maximum connection bandwidth on some protection path links. This feature may require advertisement of several parameters that approximate the $CPP_i$ function.

Figure 9:
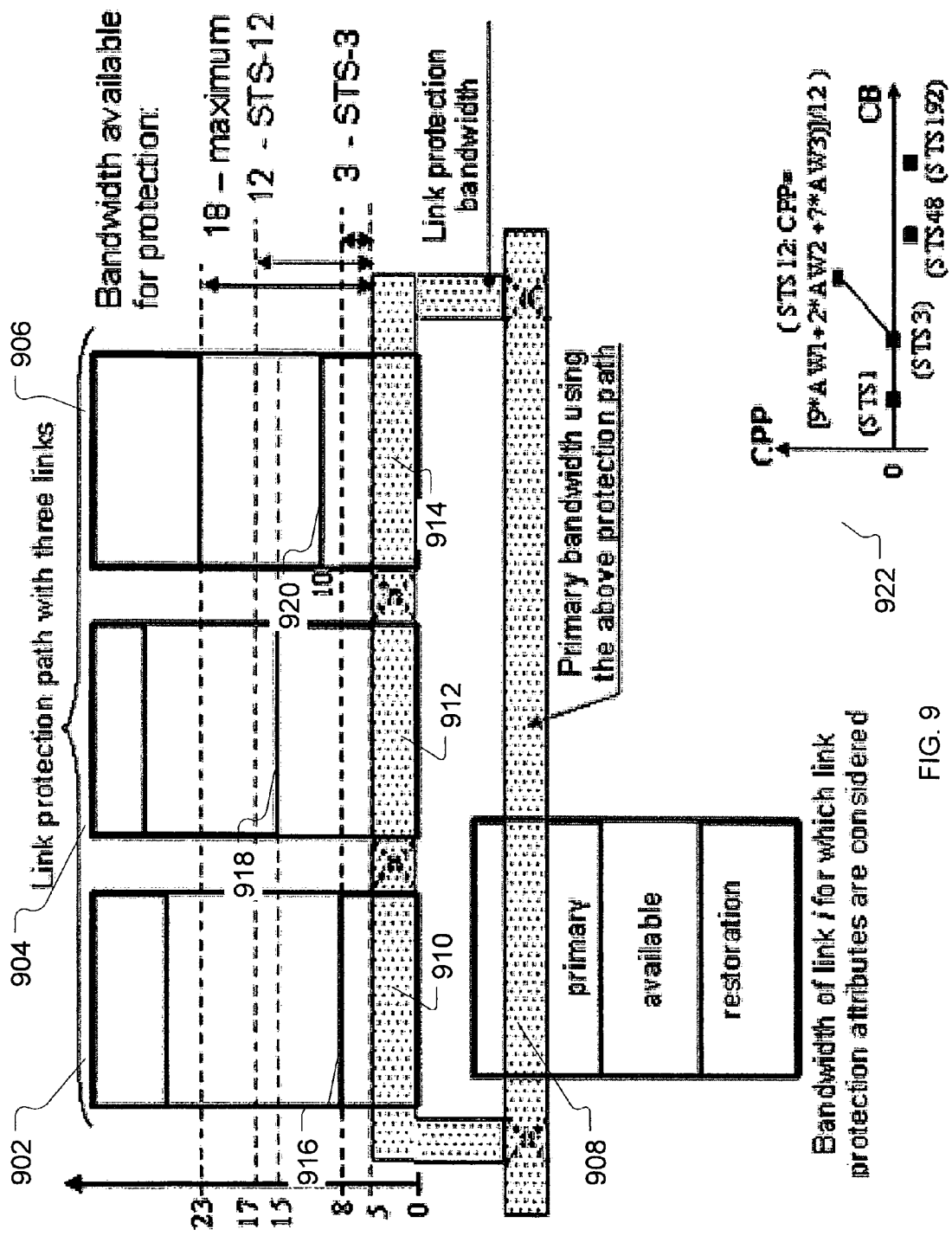
FIG. 9 illustrates the link protection path-cost function in a SONET network assuming a static link-cost function.

FIG. 9 illustrates the link protection path-cost function in a SONET network assuming a static link-cost function (e.g., LC=f(administrative weight AW)). In this case, the number of cost parameters corresponds to the number of connection bandwidth requirements in the SONET hierarchy (e.g., each different bandwidth in the hierarchy, for example, STS-3, typically has a different administrative weight AW). Negative values (e.g., for STS48 and STS 192) correspond to connection bandwidths that require more bandwidth than is available.

In FIG. 9, boxes 902, 904, and 906 represent the use of bandwidth on three links (A, B, and C) along a link detour path. Each of these boxes shows 5 STS-1 units of bandwidth 910, 912, 914, respectively, reserved for protecting the 5 STS-1 bandwidth demand 908 associated with a primary path link i. Each of boxes 902, 904, and 906 also represent the use of each associated links bandwidth for primary, available, and recovery bandwidth categories. For example, as represented by box 902, link A has 8 STS-1s reserved for protection (916). Link B has 15 STS-1s reserved for protection (918) and link C has has 10 STS-1s reserved (920).

Note that the available bandwidth on the link detour path for protection of a new demand on link i is limited to the minimum available bandwidth of the three detour path links, in this case equal to 18 STS-1s per link C.

Given this situation, the graph of cost of the protection path CPPi 922 associated with link i shows what CPPi would for five different sizes of a new demand on link i. As illustrated, a demand of either STS-1 or STS-3 can be accommodated without requiring any additional bandwidth for recovery on the detour links A, B, and C. Therefore the CPP value for those demands is shown as zero. For an STS-12 demand, 9 additional STS-1s are needed on link A for recovery since three STS-1s are already reserved and can be shared (assuming the reservation is for a disjoint link recovery). Similarly, 2 additional STS-1s are needed on link B where 15 units are already reserved (10 above the 5 STS-1 demand of link i), and 7 additional STS-1s are required on link C. These numbers are used with the respective weights to calculate CPPi value for a STS-12 demand. Since the shared bandwidth plus the available capacity of link B is insufficient (see box 904) to accommodate an STS-48 demand, the CPPi value associated with STS-48 is negative. Similarly, the CPPi value is negative for an STS-192 demand. Note that CPPi is a function of the demand, thus, in some embodiments, a set of CPPi values can be advertised for each link I, where each element of the set is associated with a different demand value or range of values.

The above joint-optimization approach has the advantage of improving bandwidth utilization by joint optimization of the primary and protection paths in a distributed implementation. Also, the crank-backs are minimized since the connection source knows the availability of link protection a priori. One potential drawback to this approach is increased link advertisement load that may limit the LSA-update frequency and that in turn may reduce the accuracy of the link-protection attributes.

Loop Avoidance in Link-Recovery Schemes for Mesh Networks

Embodiments of the present invention include a method to calculate (in a distributed fashion), reserve, and activate (in the event of a failure) shortened link-detour paths. Shortened link-detour paths avoid loops caused by overlapping of primary and link-detour paths and therefore can significantly increase network efficiency in terms of the number of accepted connections.

Loop avoidance includes three parts: (1) a modified link-detour path calculation, (2) signaling extensions in the link-detour path reservation process, and (3) signaling extensions in the recovery process.

The link-detour path calculation is modified by the constraint that the calculated link-detour path and the primary path are link and node disjoint.

The following assumptions and definitions are provided to facilitate further discussion:

Branching node—a node, upstream of a link with respect to an end-to-end connection that traverses the link, which controls the rerouting of traffic around that link in the event of a failure of the link. Note that, prior to loop avoidance, the branching node for a link is the upstream node of a link that terminates the link; while, after loop avoidance, the branching node could be a transit node that is further upstream in the end-to-end connection path.

Merging node—a node, downstream of a link with respect to an end-to-end connection that traverses the link, which receives the traffic of the connection that was rerouted around that link in the event of a failure of the link. Note that, prior to loop avoidance, the merging node for a link is the downstream node of a link that terminates the link; while, after loop avoidance, the merging node could be a transit node that is further downstream in the end-to-end connection path.

Full-LD path—a link-detour path between an upstream node and a downstream node of a link.

Shortened-LD path—the portion of a full-LD path that connects the branching and merging nodes.

Signaling nodes—transit nodes that belong to the full-LD path but not to the shortened link-detour path.

Protected segment—A protected segment is the portion of a primary path that is between the branching and merging nodes. It is assumed that, in case of a bidirectional end-to-end connection along a path between two end nodes in a network, any of the two end nodes can receive the request for the connection, whereas, in the case of a unidirectional connection between two end nodes, only the node that is upstream to the connection can receive the connection request. For convenience, the node receiving the connection request is referred to as the connection's source node, and the other end node is referred to as the connection's destination node, irrespective of the type of connection. For example, a bi-directional connection that is set up between nodes A and D can be requested at either node A or node D. If this connection is requested at node A, then node A will be referred as the source node and node D will be referred as the destination node. In contrast, a unidirectional connection from node A to node D can only be requested at node A. Note that, in this document, only bi-directional connection requests are discussed, although similar principles apply to unidirectional requests.

The source node of an end-to-end connection is responsible for computing the primary path for the connection as well as verifying that, for each link along the primary path, there exists at least one link-detour path (LD path) that can accommodate the recovery bandwidth required for that link. The upstream node of each link in the primary path (and not necessarily the source node of the end-to-end connection) is responsible for computing the LD path for its link. For example, suppose that a link connecting node A and node B is along the primary path for an end-to-end connection. Further, suppose node A is the node that is connected upstream to a particular link in the primary path for the connection (that is, node A is closer to the source node than node B is). In this case, node A will compute the LD path. Note that, with minimal additional information, the upstream-terminating node of a link can compute a more-optimal LD path than the source node.

Embodiments of the present invention employ three major mechanisms to avoid loops in calculated paths. The three mechanisms are "source-node (centralized)," "segment-based," and the preferred embodiment "upstream-node (distributed)." Loop avoidance can significantly improve resource utilization within a network.

Source-Node (Centralized) Loop Avoidance

In this embodiment, when a new connection request arrives at a source node, a centralized routing engine calculates both a primary path for the connection and a loop-free link-detour path for each link of the primary path. The resulting LD path information is passed to the transit nodes of the primary path during the primary path setup process. Note that the loop-free LD path for each link might include a branching node that is not the immediate upstream node of the link due to loop-avoidance optimizations performed by the centralized routing engine. In any event, each branching node sets up its link's LD-path (reserves bandwidth, etc.). When a link failure occurs, the node that is immediately upstream of the failed link sends a failure message to the corresponding branching node, which then activates the corresponding LD path.

Advantages of this approach include a possibly optimal choice of branching, merging nodes according to selected objectives, and no path computations in the transit nodes. Disadvantages include increased complexity of the routing engine and limited sharing optimization.

Segment-Based Loop Avoidance

In a segment-based approach, a source node for an end-to-end connection calculates the primary path for the connection and then identifies path segments within the primary path. Path segments are portions of the primary path that include transit nodes that are of connectivity no greater than two and that can therefore not serve as branching or merging nodes. The starting and ending nodes of each segment are thus identified as the branching and merging nodes, respectively, of LD paths for links within that segment. This information is passed to the transit nodes of the primary path during the primary path setup process. Then, each branching node calculates and sets up the LD path between itself and its merging node. When a failure occurs, the node that is immediately upstream of the failed link sends a failure message to the corresponding branching node, which then activates the corresponding LD path. Branching nodes again control the LD paths.

Advantages of this approach include the primary path calculation being unaffected. Disadvantages include, depending on traffic conditions, some probability of loops remaining in the network.

Upstream-Node Distributed Loop Avoidance (UNDLA)

Here, the primary path calculation and setup are unchanged. In this preferred embodiment, during the LD path bandwidth reservation phase, each transit node calculates the LD path for its downstream incident link on the primary path. If a loop exists in the resulting full-LD path, it is then shortened and the branching and merging nodes are selected. In this approach, the immediately upstream node of a link remains in control of the shortened-LD path, and the branching and merging nodes have no control functionality. During the recovery path bandwidth reservation process, the other upstream nodes that are covered by the shortened-LD path can be provided with the failure ID corresponding to the primary connection under consideration. In this way, they know they do not need to perform LD path calculation corresponding to their incident downstream link along that primary path for the connection.

Advantages of this approach include minimal changes to the existing LD path algorithms and protocols. Disadvantages include the possibility of overlapping of branching and merging nodes.

There are three main approaches to upstream-node distributed loop avoidance (UNDLA): (1) basic, (2) enhanced, and (3) non-revertive. Note that, in general, the computation of link-detour paths is realized in the reservation control (upstream) node for a link and can be divided into two parts: (a) calculation of a path between the upstream and downstream nodes (i.e., the computation of the full link-detour path) and (b) loop elimination (computation of a shortened link-detour path). Loop elimination requires knowledge of primary path topology in the link upstream node.

1. UNDLA Basic Solution

In the basic solution, each link-detour path is calculated independently of the others and independently of the primary path. As a result, these LD paths may partially overlap protected segments.

Figure 10:
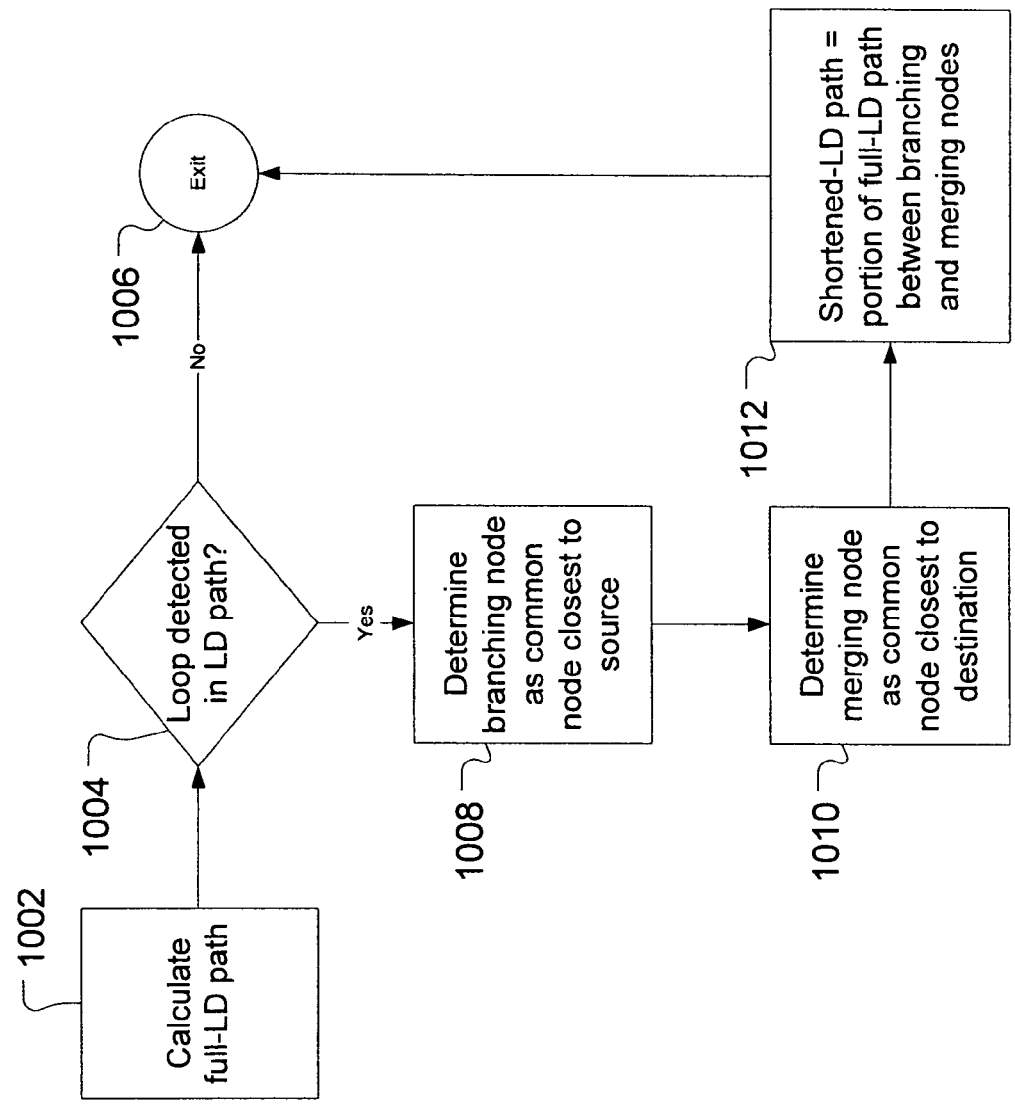
FIG. 10 illustrates an exemplary loop-avoidance process applied to each link in the primary path of an end-to-end connection.

For this solution, FIG. 10 illustrates an exemplary loop-avoidance process applied to each link in the primary path of the end-to-end connection. In step 1002, the full-LD path for a link in the primary path is calculated (e.g., using a shortest-path algorithm to calculate a path between upstream and downstream terminating nodes for the link). If, in step 1004, it is determined that no loops exist, then the terminating nodes that are upstream and downstream of the link are designated the branching and merging nodes of the LD path, and the process exits in step 1006.

However, if loops are detected in the full LD path, then, in step 1008, the branching node is determined as that node that is common to both the primary path and the full LD path and that is closest to the connection source. Then, in step 1010, the merging node is determined as that node that is common to both the primary path and the full-LD path and that is closest to the connection destination. In step 1012, the shortened-LD path is set equal to the portion of the full-LD path that is directly between the branching and merging nodes.

2. UNDLA Enhanced Solution—Revertive

Figure 11:
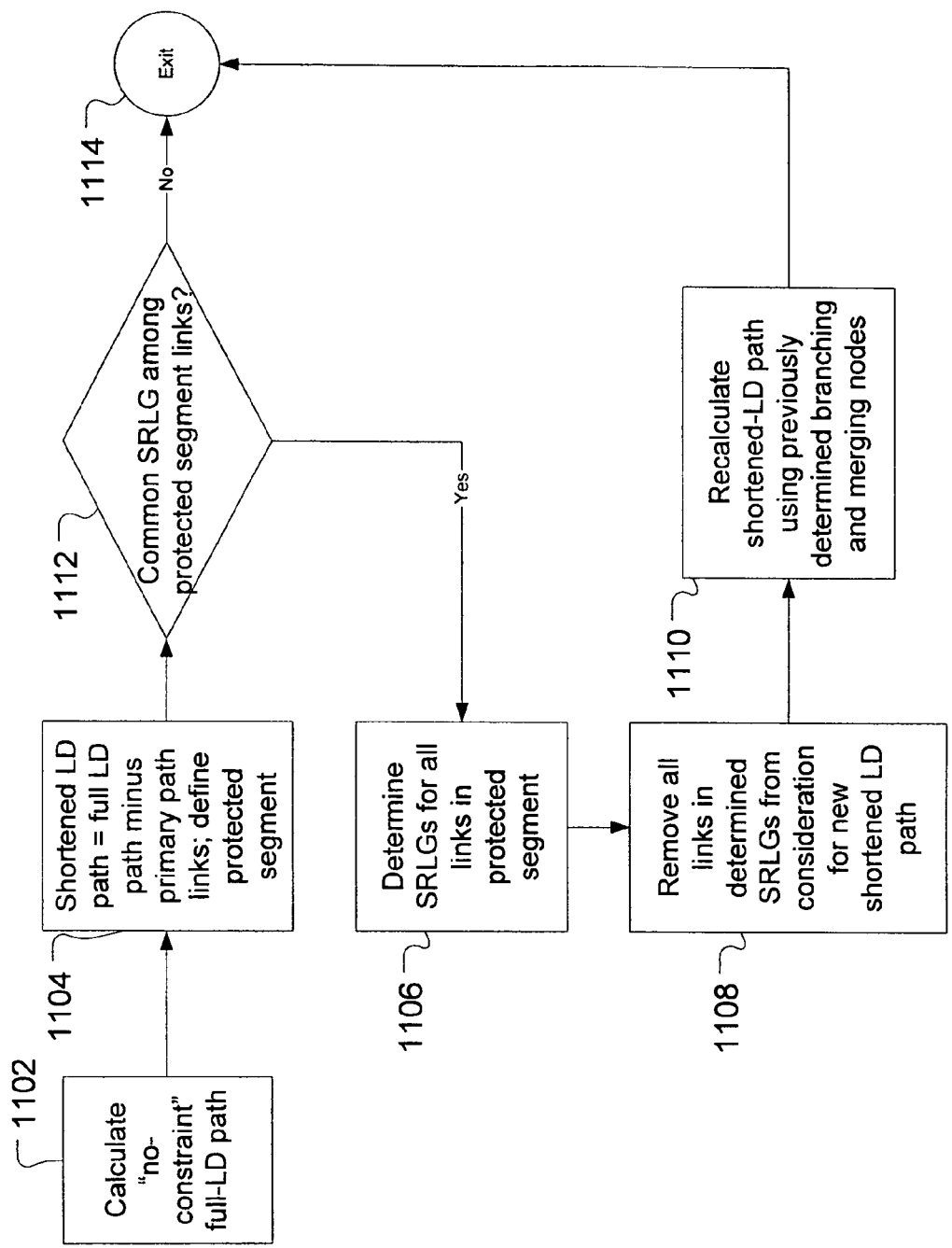
FIG. 11 illustrates another exemplary loop-avoidance process applied to each link in the primary path of an end-to-end connection.

In the enhanced solution, all links within a protected segment use the same LD path. For this solution, FIG. 11 illustrates another exemplary loop-avoidance process that can be applied to each link in the primary path of the end-to-end connection. In step 1102, the full-LD path for a link in the primary path is calculated from a network topology where the primary path links are marked as "no-constraint" (e.g., assigned a link cost of zero). In step 1104, primary path links are subtracted from the full-LD path to determine the shortened-LD path and define the protected segment.

Note that, in this solution, the objective is to use the same LD path for all links in a protected segment. Each link in the protected segment belongs to at least one shared-risk link group (SRLG) that might include multiple links. It is thus important to make sure that none of the links used in the shortened-LD path are also in an SRLG for one or more of the links in the segment. Otherwise, a failure of a link in the protected segment will be associated with some significant probability of failure of a link along the shortened-LD path. Assuming the initial shortened-LD path calculation was done in consideration of the SRLG associated with a specific link in the primary path, if any link in the resulting protected segment has an SRLG in common with the specific link, a new calculation is done that considers all SRLGs associated with links in the protected segment and excludes them from the topology for the new calculation. Thus, in step 1112, a test is performed to see if another link in the protected segment has an SRLG in common with the specified link. If the test fails, the process exits in step 1114.

However, if the test passes, then, in step 1106, the SRLGs of all links in the segment are determined, and, in step 1108, all links in the SRLGs are removed from the current shortened-LD path. Finally, in step 1110, an LD path for the link is recalculated using the previously determined branching and merging nodes, and this new path is used as the shortened-LD path. The process exits in step 1114. Note that, if the exclusion process makes the previously calculated branching and merging nodes invalid for the new shortened-LD path, the new topology can be used in the calculation of a new full-LD path as a first step and then the new shortened-LD path calculated from the new full-LD path. Ultimately, this new shortened-LD path is combined with any primary path links from the source node to the branching node and any primary path links from the merging node to the destination node to form a new recovery path for all the links in the protected segment.

Note that each demand in the protected segment can be assigned a different recovery path if so desired.

Advantages of this solution include achieving a shortened-LD path with minimum cost. Disadvantages include the fact that the full-LD path could be longer than the LD path that results from the basic solution; however, this should not be a problem if a constraint for a maximum number of nodes in the link-detour path is introduced.

3. UNDLA Non-Revertive or Minimum-Cost Primary

Figure 12:
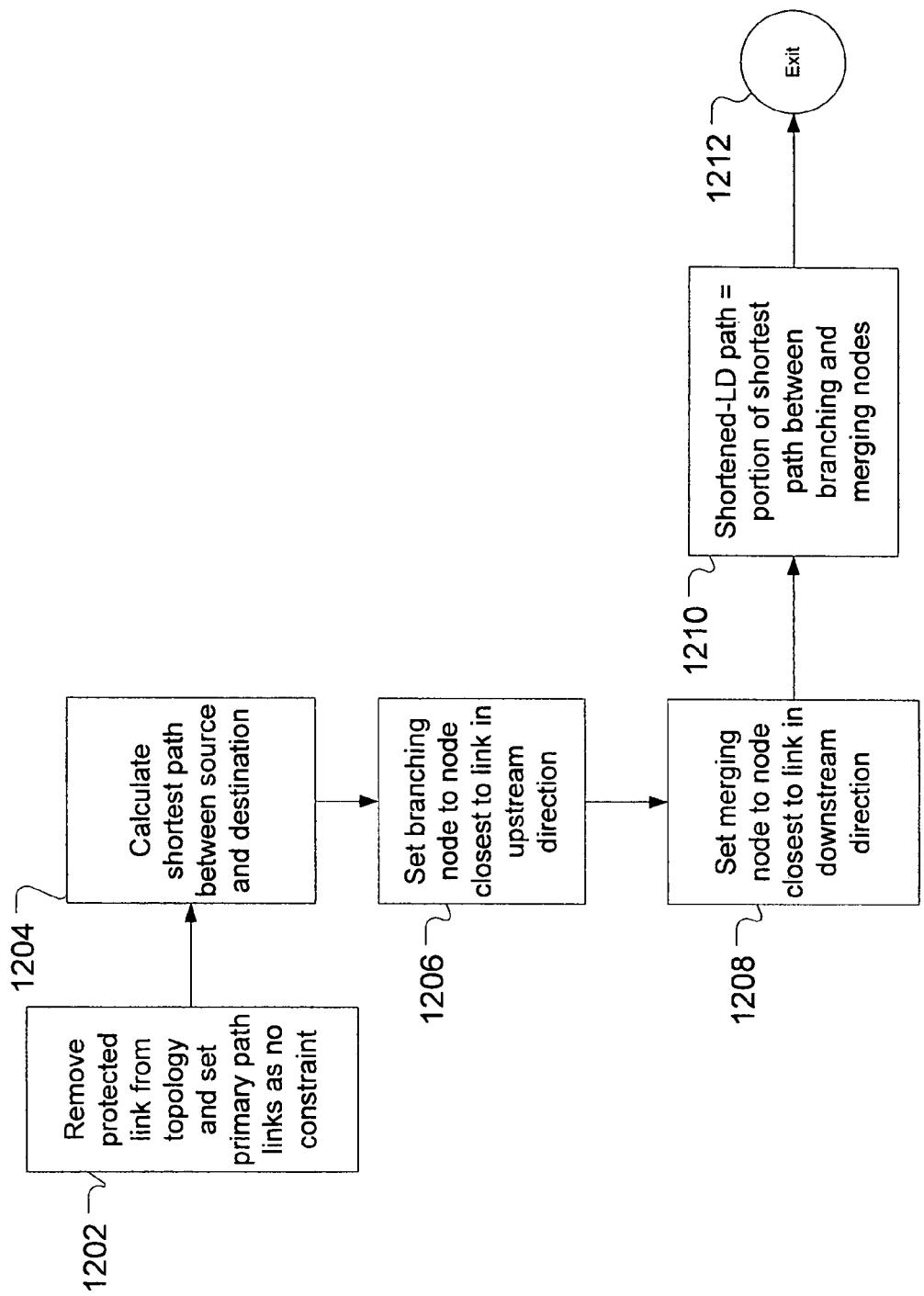
FIG. 12 illustrates another exemplary loop-avoidance process that is applied to each link in the primary path of an end-to-end connection.

The following embodiment additionally provides for reducing the cost of the resultant primary path during loop elimination calculations. This solution is called "non-revertive" since, in this embodiment, once traffic is switched over to the shortened-LD path, the shortened-LD path becomes the new primary path for the connection, and recovery of the failed link does not result in traffic being "reverted" to the original primary path. FIG. 12 illustrates another exemplary loop-avoidance process that can be applied to each link in the primary path of the end-to-end connection. In step 1202, the link under consideration is removed from the topology and the primary links are marked as no-constraint links. Next, in step 1204, a shortest path between the source and destination of the primary path is calculated (by any of the aforementioned or conventional methods).

Then, in steps 1206 and 1208, the nodes in the path that are common to the primary path and the shortest path just calculated are identified and the common nodes that are closest to the link under consideration in the upstream direction and in the downstream direction become, respectively, the branching and merging nodes of the shortened-LD path for the link. Finally, in step 1210, the shortened LD path is set equal to the portion of the shortened path that lies between the newly defined branching and merging nodes and in step 1212, the process exits. If needed, the full-LD path can be defined as the concatenation of the shortened-LD path and the primary path between the branching and merging nodes minus the link under consideration to create a new primary path. The process exits in step 1212.

Advantages of this approach include achieving a new primary path in case of failure at minimum cost. Disadvantages include the fact that the full link-detour path can be longer than in the other solutions.

LD Path Reservation

The reservation setup messages are slightly different in the basic, enhanced, and non-revertive loop avoidance embodiments. In the basic embodiment, a reservation setup message is sent from the reservation control node to the branching node, then along the shortened-LD path to the merging node, and from there, to the downstream node. The message carries information that classifies nodes as branching, merging, or transit nodes.

In the enhanced loop avoidance embodiment, the reservation setup message is sent along the full-LD path. The message carries information that classifies nodes as branching, merging, signaling, or transit nodes. The message also carries associated failure IDs, if applicable. The failure IDs are used to avoid having more than one shortened-LD path associated with the set of links in the protected segment associated with the shortened-LD path.

In the non-revertive loop avoidance embodiment, the reservation message may need to carry additional information that is required in the shortened-LD path related nodes to take full control of the recovery path in the case of failure.

LD Path Reservation Actions at Each Node

In the basic embodiment, branching, merging, and transit nodes reserve cross-connects in anticipation of a failure. In this scheme, each link in the protected segment makes an independent reservation. This limits, in general, using the same shortened-LD path for all links in the protected segment since each LD path can be different. As a consequence, there is a possibility of partly overlapping protection segments and that may cause problems in a scenario where a second failure occurs.

In the enhanced embodiment, signaling nodes (and the branching node if different from the reservation control node) will associate a failure ID with the primary connection for which the LD path is reserved. If this signaling node previously made an LD-path reservation, this reservation should be torn down. When the signaling node later becomes an upstream node that is to reserve an LD path for the same primary connection, it sends the reservation message with the associated failure IDs so the same link-detour path can be used for all links in the protected segment. Branching, merging, and transit nodes perform the same actions as in the basic solution except when they encounter a failure ID in the reservation message, the new failure ID is linked to the existing reservation and no new cross connects are added. Actions for nodes in the non-revertive embodiment are identical to the actions for corresponding nodes in the enhanced embodiment.

Advantages of this approach include that the same LD path is used for all links in the protected segment. Disadvantages include that the failure ID concept has to be incorporated into signaling and reserved cross-connect infrastructure.

Link First-failure Recovery

For a first failure in the network, in the basic embodiment, the failure message is sent from the reservation control node to the branching node, then along the shortened-LD path to the merging node, and then to the downstream node.

In the enhanced embodiment, the failure message is sent from the reservation control node to the branching node, then along the shortened-LD path to the merging node, and then to the downstream node. At the branching and merging nodes, the node first checks to see if any of the associated failure IDs are already activated. If so, no action is taken other than confirmation that the recovery is in place. Otherwise, the reserved cross-connect is activated.

In the non-revertive embodiment, the node actions are the same as in the enhanced embodiment, except that, additionally, once recovery is confirmed, the shortened-LD path nodes take over control of the new primary path, while the failed link upstream node tears down the old primary path between the branching and merging nodes.

Second Failure on the Primary Path

In the basic embodiment, since each link-detour path is calculated independently for each link, the protection segments for each link can overlap each other (partially or fully) and there can be problems with second-failure recovery.

In a first scenario, two failures occur on two protection segments with common branching and/or merging nodes. Independent of whether or not the second failure is within the protected segment of the first failure, the link recovery for the second link can fail. When the second failure occurs, the connection will still be protected by the link-detour path that was put into place following the first failure. However, if the first failure is repaired, and the connection path is allowed to revert to the original primary path, the reversion will disconnect the end-to-end connection because of the second failure. Therefore, the repairs should be synchronized in such a way that the second failure is repaired first. Alternatively, path-based recovery can be used to recover more than one link failure.

In a second scenario, single event failures occur on two different protected segments simultaneously where the protected segments are partly overlapping and they have different branching and merging nodes. In this scenario, the recovery of the second failure can disconnect the end-to-end connection. In this case, path-based restoration will be activated.

Note that, in the enhanced embodiments, there are no overlapping protection segments since, for each protection segment, there is one LD path. If a second failure is within the protected segment of the first failure, its failure ID is associated with the active recovery path, and the recovery message will be confirmed without any cross-connect actions upon reception of the message at the branching, transit, and merging nodes, other than a confirmation of the recovery. In each node of the shortened-LD path, the second failure ID will have already been marked as activated. Therefore, independent of which failure is repaired first, its rollover and reversion messages will only change the status of its failure ID from active to non-active, but the cross-connects will stay intact, since the other failure ID will still be active, and the connection will not be lost.

Recovery/Reversion

Once a failure is repaired, in the basic embodiment, messages are sent to branching and merging nodes to rollover (or revert) the connections back to the original primary path. Once this action is confirmed, a tear-down message is sent along the link-detour path. This message serves to restore the state from before the failure. If there was a second failure within the protected segment and it is not repaired by now, after rollover, the connection will be broken, and path recovery will take over.

Advantages of this approach include simplicity. Disadvantages include that the primary path is broken if the second failure in the protected segment is not repaired before the first failure is repaired and protection reestablished.. This issue can be solved by coordination of the failure repairs.

In the enhanced embodiment, the signaling process is the same as in the basic solution except that, in each of the shortened link-detour path nodes, there are two possible actions that can occur after receiving the rollover or reversion messages. If the failure ID is the only active failure among all the associated failures on the common protected segment, then the process is the same as in the basic solution. Otherwise, the failure ID status is changed to non-active, but no actions (e.g., cross-connect reassignments) are performed. Instead, the messages are confirmed as if the action was taken.

Advantages of this approach include that the primary path is protected even if the second failure in the protected segment is not repaired before the first failure is repaired. Disadvantages include that implementation of the failure ID associations is required.

Although the present invention has been described in the context of optical networks, the invention can also be implemented in the context of other networks such as all electrical networks and hybrid optical/electrical networks.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A link-based recovery method for a mesh network, the method comprising:

developing N candidate primary paths, between a source node and a destination node for a demand, as a function of N sets {ABi} of available bandwidths, wherein each set {ABi} corresponds to one of the N candidate primary paths, and each element ABi of each set corresponds to the available bandwidth on a link i of the corresponding candidate primary path;

selecting a first primary path, from the N candidate primary paths, as a function of N sets {LCi} of link costs, wherein each set {LCi} corresponds to one of the N candidate primary paths, and each element LCi of each set corresponds to a link cost of a link i in the corresponding candidate primary path; and computing a link detour (LD) path for each link i in the first primary path as a function of a set {ABPi} of available LD bandwidths, wherein each element ABPi of the set {ABPi} is equal to the minimum value from the set {ABj} of available bandwidths, wherein each element ABj of the set {ABj} corresponds to total available bandwidth on a link j in a candidate LD path for link i.

2. The invention of claim 1, wherein:

each link j in each of a plurality of candidate LD paths for link i of the first primary path has a link cost associated with it; and computing the LD path for each link i in the first primary path comprises selecting the LD path for link i as a function of link cost.

3. The invention of claim 2, wherein computing an LD path comprises:

computing a sum of the link costs associated with each link j in two or more candidate LD paths for link i of the first primary path to determine an LD path link cost sum; and choosing the LD path for the link i of the first primary path to be the candidate LD path with the smallest LD path link cost sum.

4. The invention of claim 2, wherein each link cost is inversely related to the available bandwidth on the link.

5. The invention of claim 2, wherein each link cost is inversely related to the available shared bandwidth on the link.

6. The invention of claim 1, wherein:
selecting the first primary path comprises:
computing a sum of the link costs $LC_i$ of all links i in each of the N candidate primary path to determine a link cost sum corresponding to each candidate primary path; and
choosing the first primary path to be the candidate primary path with the smallest link cost sum.

7. The invention of claim 1, wherein developing the N candidate primary paths and selecting the first primary path for the demand are performed at the source node.

8. The invention of claim 1, wherein computing the link detour (LD) path for a given link i in the first primary path is performed at a controlling node for link i, wherein the controlling node for link i is a terminating node for link i that is immediately upstream of link i with respect to the demand.

9. The invention of claim 1, comprising:
calculating a LD path cost $CPP_i$ for each link i of each candidate primary path, wherein $CPP_i$ is a function of at least the administrative weight of each link within the link detour path for link i;
calculating a cost of available bandwidth $CAB_i$ for each link i of each candidate primary path, wherein $CAB_i$ is inversely related to the available bandwidth on link i; and
calculating the link cost $LC_i$ for each link i of each candidate primary path as a function of $CPP_i$ and $CAB_i$.

10. The invention of claim 9, wherein $CPP_i$ is calculated and distributed to the rest of the network by a controlling node for link i, wherein the controlling node for link i is a terminating node for link i that is immediately upstream to link i with respect to the demand.

11. The invention of claim 1, wherein available bandwidth on a link is defined as a measure of total amount of currently unused bandwidth on the link.

12. A protection manager for a mesh communications network, the manager comprising one or more computing elements adapted to:
develop N candidate primary paths, between a source node and a destination node for a demand, as a function of N sets $\{AB_i\}$ of available bandwidths, wherein each set $\{AB_i\}$ corresponds to one of the N candidate primary paths, and each element $AB_i$ of each set corresponds to the available bandwidth on a link i of the corresponding candidate primary path;
select a first primary path, from the N candidate primary paths, as a function of N sets $\{LC_i\}$ of link costs, wherein each set $\{LC_i\}$ corresponds to one of the N candidate primary paths, and each element $LC_i$ of each set corresponds to a link cost of a link i in the corresponding candidate primary path; and
compute a link detour (LD) path for each link i in the first primary path as function of a set $\{ABP_i\}$ of available LD bandwidths, wherein each element $ABP_i$ of the set $\{ABP_i\}$ is equal to the minimum value from the set $\{AB_j\}$ of available bandwidths, wherein each element $AB_j$ of the set $\{AB_j\}$ corresponds to total available bandwidth on one link j in an LD path for link i.

13. The invention of claim 12, wherein:
each link j in each of a plurality of candidate LD paths for link i of the first primary path has a link cost associated with it; and
computing the LD path for each link i in the first primary path comprises selecting the LD path for link i as a function of link cost.

14. The invention of claim 13, wherein computing an LD path comprises:
computing a sum of the link costs associated with each link j in two or more candidate LD paths for link i of the first primary path to determine an LD path link cost sum; and
choosing the LD path for the link i of the first primary path to be the candidate LD path with the smallest LD path link cost sum.

15. The invention of claim 13, wherein each link cost is inversely related to the available bandwidth on the link.

16. The invention of claim 13, wherein each link cost is inversely related to the available shared bandwidth on the link.

17. The invention of claim 12, wherein:
selecting the first primary path comprises:
computing a sum of the link costs $LC_i$ for all links i in the primary path to determine a link cost sum; and
choosing the first primary path to be the primary path with the smallest link cost sum.

18. The invention of claim 12, wherein developing the N candidate primary paths and selecting the first primary path for the demand are performed at the source node.

19. The invention of claim 12, wherein computing the link detour (LD) path for a given link i in the first primary path is performed at a controlling node for link i, wherein the controlling node for link i is a terminating node for link i that is immediately upstream of link i with respect to the demand.

20. The invention of claim 12, wherein the one or more computing elements are adapted to:
calculate a LD path cost $CPP_i$ for each link i of each candidate primary path, wherein $CPP_i$ is a function of at least the administrative weight of each link within the link detour path for link i;
calculate a cost of available bandwidth $CAB_i$ for each link i of each candidate primary path, wherein $CAB_i$ is inversely related to the available bandwidth on link i; and
calculate the link cost $LC_i$ for each link i of each candidate primary path as a function of $CPP_i$ and $CAB_i$.

21. The invention of claim 20, wherein $CPP_i$ is calculated and distributed to the rest of the network by a controlling node for link i, wherein the controlling node for link i is a terminating node for link i that is immediately upstream to link i with respect to the demand.

22. The invention of claim 12, wherein available bandwidth on a link is defined as a measure of total amount of currently unused bandwidth on the link.

* * * * *